(12) United States Patent
Yamanouchi et al.

(10) Patent No.: US 7,792,397 B2
(45) Date of Patent: Sep. 7, 2010

(54) HOLDING MEMBER FOR HOLDING A PLURALITY OF CIRCUIT BOARDS AND MODULE UTILIZING THIS HOLDING MEMBER

(75) Inventors: Yuchi Yamanouchi, Toyota (JP); Ryoji Oomura, Kawasaki (JP); Tomohiro Kikuta, Kawasaki (JP); Shigeru Kobayashi, Kawasaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 326 days.

(21) Appl. No.: 12/083,152

(22) PCT Filed: Oct. 6, 2006

(86) PCT No.: PCT/JP2006/320125

§ 371 (c)(1),
(2), (4) Date: Apr. 4, 2008

(87) PCT Pub. No.: WO2007/043481

PCT Pub. Date: Apr. 19, 2007

(65) Prior Publication Data

US 2009/0162006 A1    Jun. 25, 2009

(30) Foreign Application Priority Data

Oct. 7, 2005 (JP) .............................. 2005-294377
Mar. 22, 2006 (JP) .............................. 2006-078870

(51) Int. Cl.
*G02B 6/12* (2006.01)
*G02B 6/36* (2006.01)
*H01R 33/945* (2006.01)

(52) U.S. Cl. .............................. 385/14; 385/88; 385/89; 439/577

(58) Field of Classification Search .................. 385/14, 385/88, 89; 439/577
See application file for complete search history.

(56) References Cited

FOREIGN PATENT DOCUMENTS

| JP | 5-77954 | 10/1993 |
|---|---|---|
| JP | 8-46354 | 2/1996 |
| JP | 08-046354 | * 2/1996 |
| JP | 8-271759 | 10/1996 |
| JP | 9-197189 | 7/1997 |
| JP | 9 243851 | 9/1997 |
| JP | 10-135911 | 5/1998 |
| JP | 10-221565 | 8/1998 |
| JP | 11-354231 | 12/1999 |
| JP | 2003-222761 | 8/2003 |

(Continued)

*Primary Examiner*—Uyen-Chau N Le
*Assistant Examiner*—Kajli Prince
(74) *Attorney, Agent, or Firm*—Finnegan, Henderson, Farabow, Garrett & Dunner, LLP

(57) ABSTRACT

The object of the present invention is to provide a technique for accurately transmitting information, wherein optical signals are the medium of information, between circuit boards.

A holding member 10 taught in the present specification holds a plurality of circuit boards 20 with a predetermined distance therebetween, and provides an optical communication path between the circuit boards 20. The holding member 10 comprises a body 15 and an optical waveguide 12 that penetrates the body 15. The holding member 10 further comprises a light receiving portion 50 and a light emitting portion 40. By means of the holding member 10, an optical signal emitted at one circuit board 20 and received at an other circuit board 20 travels along the optical waveguide 12 of the holding member 10.

24 Claims, 18 Drawing Sheets

FOREIGN PATENT DOCUMENTS

| | | |
|---|---|---|
| JP | 2003-329891 | 11/2003 |
| JP | 2004-177549 | 6/2004 |
| JP | 2004-302279 | 10/2004 |
| JP | 2005-189730 | 7/2005 |

* cited by examiner (A)  (B)

(a)　　　　　　　　　(b)

(A)  (B)

(A)    (B)

HOLDING MEMBER FOR HOLDING A PLURALITY OF CIRCUIT BOARDS AND MODULE UTILIZING THIS HOLDING MEMBER

FIELD OF THE INVENTION

The present application claims priority to Japanese Patent Application No. 2005-294377 filed on Oct. 7, 2005 and to Japanese Patent Application No. 2006-078870 filed on Mar. 22, 2006, the contents of which are hereby incorporated by reference into the present specification.

The present invention relates to a holding member that holds a plurality of circuit boards with a predetermined distance therebetween, and that provides an optical communication path between the circuit boards. The present invention further relates to a module wherein a plurality of circuit boards is held by a holding member such that optical communication is possible.

BACKGROUND OF THE INVENTION

Modules are being developed wherein a plurality of circuit boards mounting circuits consisting of electronic and electric components, etc. are stacked with a predetermined distance between the circuit boards. In this type of module, the circuit boards are held parallel to one another by a holding member. Compared to the case where a plurality of circuit boards is disposed on the same plane, stacking the plurality of circuit boards by means of the holding member allows this module to save space. This type of module is utilized while housed within a housing or the like. For example, this type of module is utilized in an information processing device mounted in a vehicle, etc.

It is desirable that a large amount of information is transmitted accurately between the stacked circuit boards. Japanese Utility Model Application Laid-Open Publication No. 1993-77954 teaches a module in which a light receiving element and a light emitting element are utilized to transmit information between circuit boards. In this module, the light emitting element is disposed on one circuit board and the light receiving element is disposed on an other circuit board. From a plan view, the light emitting element and the light receiving element are disposed so as to overlap. In the technique set forth in Japanese Utility Model Application Laid-Open Publication No. 1993-77954, an optical signal emitted from the light emitting element is received by the light receiving element, thereby realizing optical communication between the circuit boards. In the module of Japanese Utility Model Application Laid-Open Publication No. 1993-77954, the optical signal travels through a space between the circuit boards.

DISCLOSURE OF THE INVENTION

Problem to be Solved by the Invention

The module of Japanese Utility Model Application Laid-Open Publication No. 1993-77954 has the problem that it is difficult to dispose the light emitting element and the light receiving element with a positional relationship such that they overlap from a plan view. In the technique of Japanese Utility Model Application Laid-Open Publication No. 1993-77954, the circuit boards are held by a holding member (termed supporting column in Japanese Utility Model Application Laid-Open Publication No. 1993-77954). As a result, if the positional relationship between the holding member and the light emitting element in a horizontal direction is formed accurately to have a positional relationship that was determined in advance, and if the positional relationship between the holding member and the light receiving element in a horizontal direction is formed accurately to have a positional relationship that was determined in advance, the positional relationship between the light emitting element and the light receiving element can be made such that the two are disposed so as to overlap from a plan view. However, if the horizontal positional relationship of any of these deviates from the positional relationship that was determined in advance, the positional relationship between the light emitting element and the light receiving element can not be made such that the two are disposed so as to overlap from a plan view. Further, if the circuit boards expand or contract due to temperature change or the like, there is a change in the positional relationship between the light emitting element and the light receiving element, and the light emitting element and the light receiving element deviate from a facing positional relationship. If the positional relationship of the light emitting element and the light receiving element is unstable, the transmission and reception of the optical signal becomes unstable. In the technique of Japanese Utility Model Application Laid-Open Publication No. 1993-77954, the optical communication has a low degree of stability.

The present invention teaches a technique for holding the circuit boards such that stable optical communication between the circuit boards is ensured.

Means to Solve the Problem

The technique taught in the present specification comprises an optical waveguide for optical signals to travel within a holding member that holds circuit boards.

The holding member taught in the present specification has the dual role of mechanically holding the circuit boards, and of providing an optical communication path along which optical signals travel. The holding member taught in the present specification has no need for a difficult construction as is the case with Japanese Utility Model Application Laid-Open Publication No. 1993-77954, in which the horizontal positional relationship between the holding member and the light emitting element and the horizontal positional relationship between the holding member and the light receiving element must be fixed accurately. Further, the holding member taught in the present specification is capable of maintaining an optical communication function utilizing the optical waveguide formed in the holding member even if the circuit boards expand or contract due to change in temperature, etc. As a result, information can be accurately transmitted between the circuit boards if the holding member taught in the present specification is utilized.

Moreover, the technique taught in the present specification is suitable for transmission techniques utilizing either single wavelength or multi wavelength optical signals. The technical scope of the technique taught in the present specification does not restrict the type of optical signal.

The holding member taught in the present specification comprises a body and an optical waveguide penetrating the body. The holding member holds a plurality of circuit boards with a predetermined distance therebetween. When the plurality of circuit boards are held by the holding member, the optical communication path is provided between the circuit boards wherein the optical waveguide penetrates the body.

The holding member taught in the present specification can mechanically hold the circuit boards such that they are separated by a predetermined distance. Further, the holding member taught in the present specification can provide the optical communication path extending between the circuit boards by utilizing the optical waveguide that penetrates the body. The holding member taught in the present specification can hold the circuit boards such that optical communication is possible.

Plastic fiber may be utilized as the optical waveguide within the holding member.

Plastic fiber is a material that is flexible and easily worked. When plastic fiber is utilized, it is possible to form holding members in many shapes.

It is preferred that the holding member comprises a first reflecting means. The first reflecting means is disposed within the optical waveguide, and reflects at least a part of an optical signal traveling along the optical waveguide toward an outside of the optical waveguide. It is preferred that the holding member further comprises a light receiving element. The light receiving element is disposed at the outside of the optical waveguide, and converts the optical signal reflected by the first reflecting means into an electrical signal.

The first reflecting means and the light receiving element are capable of converting the optical signal traveling along the optical waveguide into an electrical signal. The electrical signal converted by the first reflecting means and the light receiving element is transmitted to a circuit on a circuit board connected with the light receiving element.

It is preferred that the first reflecting means comprises a half mirror. In this case, the first reflecting means reflects the part of the optical signal traveling along the optical waveguide and lets the remainder of the optical signal through.

When the first reflecting means comprises the half mirror, the optical signal that has been let through the half mirror travels along the optical waveguide of the other holding member. When the first reflecting means comprises the half mirror, the optical signal can travel across, a plurality of holding members when an optical waveguide has been constructed across a plurality of the holding members. When the first reflecting means comprises the half mirror, optical communication between the plurality of circuit boards is possible utilizing the optical waveguide that extends across the plurality of holding members.

It is preferred that the first reflecting means comprises a pair of half mirrors. In this case, the first reflecting means reflects a part of the optical signal traveling along the optical waveguide from one side to the other side thereof toward the light receiving element, and reflects a part of the optical signal traveling along the optical waveguide from the other side to the one side thereof toward the light receiving element.

When the first reflecting means comprises the pair of half mirrors, it is possible for the optical signals traveling in both directions to be converted by the light receiving element. When the first reflecting means comprises the pair of half mirrors, it is possible to receive information from the circuit boards disposed in both directions.

It is preferred that the holding member further comprises a terminal exposed at a surface of the holding member, and a connecting wire connecting the terminal to the light receiving element. The holding member can thus ensure that a wire which electrically connects the light receiving element to the circuit board is provided. The optical signal that travels along the optical waveguide is converted into the electrical signal by the light receiving element, and is transmitted to a circuit on the circuit board via this connecting wire.

It is preferred that the holding member further comprises a light emitting element. The light emitting element is disposed at an outside of the optical waveguide, and converts an electrical signal into an optical signal. It is preferred that the holding member further comprises a second reflecting means. The second reflecting means is disposed within the optical waveguide, and reflects the optical signal from the light emitting element into the optical waveguide.

The second reflecting means and the light emitting element can supply the optical signal to the optical waveguide. The second reflecting means and the light emitting element can convert the electrical signal from a circuit on the circuit board connected with the light emitting element into the optical signal, and can supply this optical signal to the optical waveguide.

It is preferred that the second reflecting means comprises a half mirror. In this case, the second reflecting means reflects the optical signal from the light emitting element into the optical waveguide, and lets the optical signal traveling along the optical waveguide through.

When the second reflecting means comprises the half mirror, the optical signal from the light emitting element can be led along the optical waveguide, and the other optical signal traveling along the optical waveguide can be allowed through.

It is preferred that the second reflecting means comprises a pair of half mirrors. In this case, the second reflecting means reflects the optical signal from the light emitting element toward one side of the optical waveguide and reflects the optical signal from the light emitting element toward the other side of the optical waveguide.

When the second reflecting means comprises the pair of half mirrors, it is possible to supply the optical signal from the light emitting element in both directions along the optical waveguide. When the second reflecting means comprises the pair of half mirrors, it is possible to send information to circuit boards disposed in both directions.

It is preferred that the holding member further comprises a terminal exposed at a surface of the holding member, and a connecting wire connecting the terminal to the light emitting element. The holding member can thus ensure that a wire which electrically connects the light emitting element to the circuit board is provided. An electrical signal from a circuit on the circuit board is transmitted to the light emitting element via this connecting wire, and after this electrical signal is converted into an optical signal by the light emitting element, it is supplied to the optical waveguide.

It is preferred that the optical waveguide comprises a first end face formed at one side end in a penetrating direction, and a second end face formed at the other side end in the penetrating direction. It is preferred that a collecting lens is disposed at the first and/or the second end face.

In the case where a plurality of circuit boards are held, an optical waveguide is constructed that extends across the plurality of holding members by means of optically connecting the optical waveguide of each of the holding members. If the collecting lens is disposed at one end face of the optical waveguide, this collecting lens can prevent an optical signal radiated from that one end face of the optical waveguide (in the present specification, optical signals and signal lights have the same meaning, and are interpreted in a broad sense) from widening spatially even if a space is formed between one holding member and an other holding member. As a result, the collecting lens can cause an optical signal to travel efficiently from the end face of the one optical waveguide to the end face of the other optical waveguide. If the collecting lens is utilized, the optical waveguide constructed across the plurality of the holding members is capable of supplying stable optical communication. Further, if the collecting lenses are disposed at both end faces of the optical waveguide, it is possible to achieve the above effect for optical signals that are traveling in both directions along the optical waveguide.

It is preferred that the body of the holding member comprises a first portion with a larger outer diameter and a second portion with a smaller outer diameter. When the body comprises the first portion and the second portion, a step is formed between the first portion and the second portion.

The circuit board and the holding member can be assembled with a predetermined positional relationship by an inner face (or surface face) of the circuit board making contact with the step. As a result, it is possible to adjust a predetermined distance between the circuit boards based on the height of the first portion that has the larger outer diameter.

It is preferred that the first portion of the holding member comprises an insert bore which receives the second portion of the other holding member. It is preferred that the insert bore extends from an end face of the first portion along the penetrating direction of the optical waveguide. Further, it is preferred that the configuration of the insert bore and the configuration of the second portion substantially conform to one another. In this case, an end face of the optical waveguide of the holding member is optically connected to an end face of the optical waveguide of the other holding member when the second portion of the other holding member is inserted into the insert bore of the holding member. Here, "optically connected" is not restricted to the case where the end face of the optical waveguide of the holding member is physically connected to the end face of the optical waveguide of the other holding member, but also includes the case where these are separated by a predetermined distance, another member is therebetween, etc.

When the configuration of the insert bore and the configuration of the second portion substantially conform to one another, it is possible to fit the second portion of the other holding member into the insert bore of the holding member. Further, since the insert bore of the first portion extends along the penetrating direction of the optical waveguide, it is possible to optically connect the end face of the optical waveguide of the holding member to the end face of the optical waveguide of the other holding member by inserting the second portion of the other holding member into the insert bore of the holding member. The optical waveguide can thereby extend across the plurality of holding members. Optical signals can be made to travel across the plurality of holding members even in the case where the plurality of holding members are joined together.

It is preferred that the body comprises a detecting means for detecting whether the second portion of the other holding member has been inserted to a predetermined position in the insert bore of the holding member when the second portion of the other holding member has been inserted into the insert bore of the holding member. It is preferred that the body further comprises a holding means for holding the holding member and the other holding member at the predetermined position.

In order for optical communication to be performed stably between the optical waveguide of the holding member and the optical waveguide of the other holding member, it is desirable that there is a satisfactory optical connection between the end face of the optical waveguide of the holding member and the end face of the optical waveguide of the other holding member. In order for satisfactory optical connection to be realized, it is desirable that the holding member and the other holding member are disposed with a predetermined positional relationship. The detecting means is capable of detecting whether the holding member and the other holding member are connected with the predetermined positional relationship. Furthermore, the body taught in the present specification comprises the holding means that holds the holding member and the other holding member in the predetermined positional relationship. It is consequently possible to perform stable optical communication since the holding member and the other holding member are connected reliably in the predetermined positional relationship.

It is preferred that the detecting means comprises a first penetrating hole formed in at least a portion of the first portion and extending from an outer peripheral surface of the first portion to the insert bore. It is preferred that the detecting means comprises a first projection formed upon at least a portion of an outer peripheral surface of the second portion. It is preferred that the detecting means further comprises a first engagement member disposed within the first penetrating hole, one side end of the first engagement member being exposed at the outer peripheral surface of the first portion, and the other side end of the first engagement member protruding into the insert bore. When the second portion of the other holding member is inserted into the insert bore of the holding member, the other side end of the first engagement member of the holding member is elastically deformed by the second portion of the other holding member that has been inserted. The other side end of the first engagement member of the holding member engages with the first projection of the other holding member when the second portion is inserted to the predetermined position. Further, moving the one side end of the first engagement member in a predetermined direction causes the other side end thereof to move, hence, it is possible to disengage the holding member and the other holding member.

When the second portion of the other holding member is inserted into the insert bore of the holding member, the first engagement member that protrudes into the insert bore is pushed by the second portion that is being inserted, and elastically deforms. Further, when the second portion of the other holding member is inserted into a deep position in the insert bore of the holding member, the other side end of the first engagement member engages with the first projection of the other holding member. The holding member and the other holding member are connected when the first engagement member engages with the first projection. A user can thereby ascertain that the second portion of the other holding member has been inserted to the predetermined position in the insert bore of the holding member.

Furthermore, moving the one side end of the first engagement member in the predetermined direction causes the other side end thereof to move, hence it is possible to disengage the holding member and the other holding member. If holding members are connected in a wrong sequence when a plurality of holding members is to be connected, it is thereby possible to disengage the holding members and correct their sequence.

It is preferred that the holding means comprises a second penetrating hole formed in at least a portion of the first portion, this second penetrating hole extending from the outer peripheral surface to the insert bore, and receiving a second engagement member. It is preferred that the holding means further comprises a second projection formed upon at least a portion of the outer peripheral surface of the second portion. When the second portion of the other holding member is inserted to the predetermined position in the insert bore of the holding member, the second projection of the other holding member engages with the second engagement member inserted through the second penetrating hole of the holding member.

The holding means is capable of firmly maintaining the holding member and the other holding member in a state where they are connected with the predetermined positional relationship. As a result, it is possible for optical communication to be performed stably between the optical waveguide of the holding member and the optical waveguide of the other holding member. Further, the user can ascertain that the first projection is engaged with the first engagement member from a state of the second engagement member being inserted into the second penetrating hole.

It is preferred that the holding member comprises a first terminal formed upon at least a portion of an inner surface which defines the insert bore of the first portion. It is preferred that the holding member further comprises a second terminal formed upon at least a portion of an outer peripheral surface of the second portion. It is preferred that the holding member additionally comprises a wire disposed at an outside of the optical waveguide and electrically connecting the first terminal to the second terminal. In this case, when the second portion of the other holding member is inserted into the insert bore of the holding member, the first terminal of the holding member is electrically connected to the second terminal of the other holding member.

With this holding member, the first terminal of the holding member and the second terminal of the other holding member make contact when the second portion of the other holding member is inserted into the insert bore of the holding member. The wires of the plurality of holding members are electrically connected via the first terminal of the holding member and the second terminal of the other holding member when the plurality of holding members has been connected together. The wires that are electrically connected across the plurality of holding members can supply voltage to the plurality of circuit boards.

Moreover, a plurality of combinations of the first terminal, the second terminal, and the wire may be formed on one holding member. When a plurality of the combinations is formed, a plurality of voltages can be supplied.

It is preferred that the holding member comprises a grounding wire and a power supply wire. In this case, the holding member comprises a grounding first terminal formed upon at least a portion of an inner surface which defines the insert bore, a grounding second terminal formed upon at least a portion of an outer peripheral surface of the second portion, and the grounding wire disposed at an outside of the optical waveguide and electrically connecting the grounding first terminal to the grounding second terminal. The holding member further comprises a power supply first terminal formed upon at least a portion of the inner surface which defines the insert bore, a power supply second terminal formed upon at least a portion of the outer peripheral surface of the second portion, and the power supply wire disposed at an outside of the optical waveguide and electrically connecting the power supply first terminal to the power supply second terminal. In this case, when the second portion of the other holding member is inserted into the insert bore of the holding member, the grounding first terminal of the holding member is electrically connected to the grounding second terminal of the other holding member, and the power supply first terminal of the holding member is electrically connected to the power supply second terminal of the other holding member.

With this holding member, both grounding voltage and power supply voltage can be supplied to the plurality of circuit boards.

It is preferred that the holding member further comprises a noise filter. The noise filter is connected to the power supply wire, and removes unnecessary components (frequency ranges that form noise).

Stable power supply voltage can be supplied in the power supply wire by means of the noise filter removing the unnecessary components.

It is preferred that the holding member further comprises a wiping mechanism disposed in the insert bore of the first portion. The wiping mechanism comprises a wiper, and an arm supporting the wiper from the inner surface which defines the insert bore, this arm enabling the wiper to move. In the wiping mechanism, when the second portion of the other holding member is inserted into the insert bore of the holding member, the wiper moves while making contact with the end face of the optical waveguide exposed at the end face of the second portion of the other holding member.

When the wiping mechanism is disposed in the holding member, impurities or dust on the end face of the optical waveguide exposed at the end face of the second portion of the other holding member can be removed when the second portion of the other holding member is inserted into the insert bore of the holding member. As a result, by removing impurities or dust adhering to the end face of the optical waveguide, it is possible to avoid noise being superimposed upon the optical signal traveling along the optical waveguide.

Further, in Japanese Utility Model Application Laid-Open Publication No. 1993-77954 described in the background of the invention, the optical signal travels along a space between the circuit boards. As a result, the problem occurs that noise is superimposed upon the optical signal due to dust within the space if dust, etc. is present within the space.

In the holding member taught in the present specification, by contrast, the optical signal travels utilizing the optical waveguide that penetrates the body of the holding member. It is consequently possible to prevent dust, etc. from entering the optical waveguide from the exterior. When the second portion of the other holding member has been inserted into the insert bore of the holding member in the case of the holding member taught in the present specification, impurities or dust on the end face of the optical waveguide exposed at the end face of the second portion can be removed, and thereafter dust, etc. can be prevented from entering the optical signal traveling path. Since it is possible to reduce the noise superimposed upon the optical signals by impurities, dust, etc. when the holding member taught in the present specification is utilized, accurate optical signals can be made to travel.

It is preferred that the body comprises a divided portion being divided from a remaining portion of the body along the penetrating direction of the optical waveguide, and an attaching means for attaching the divided portion to the remaining portion while being capable of varying the distance therebetween. The optical waveguide comprises a third end face exposed within a space between the divided portion and the remaining portion, and formed at the optical waveguide within the divided portion. The optical waveguide comprises a fourth end face exposed within the space between the divided portion and the remaining portion, and formed at the optical waveguide within the remaining portion. It is preferred that the optical waveguide further comprises a collecting lens disposed at the third and/or the fourth end face.

There is often variation in the distance required between the circuit boards according to the type of circuit board and the purpose thereof. It is not necessary to provide a plurality of types of holding members if one type of holding member can be made to correspond to the various distances between differing circuit boards. The holding member taught in the present specification consists of the divided portion and the remaining portion and, by changing the distance between the divided portion and the remaining portion, the holding member can be made to correspond to the various distances between differing circuit boards. The holding member taught in the present specification further has a countermeasure to prevent optical communication from becoming unstable due to the optical signal spreading spatially within the space between the divided portion and the remaining portion. That is, the collecting lens is disposed at the third and/or the fourth end face of the optical waveguide that are exposed within the space between the divided portion and the remaining portion. If the collecting lens is disposed at the third end face (or the fourth end face), this collecting lens prevents the optical signal emitted from the third end face (or the fourth end face) from spreading spatially even though a space is formed between the divided portion and the remaining portion. As a result, the collecting lens can cause the optical signal to travel efficiently from the third end face (or the fourth end face) to the fourth end face (or the third end face). Further, if the collecting lenses are disposed at both the third and the fourth end faces, the above result can be achieved for optical signals traveling in both directions along the optical waveguide.

It is preferred that the attaching means comprises a first screw head formed on the divided portion, and a second screw head formed on the remaining portion. The divided portion and the remaining portion are screwed together by using the first screw head and the second screw head.

The distance between the divided portion and the remaining portion can be adjusted by adjusting the degree to which the two are screwed together.

The technique taught in the present specification can be realized in a module. The module taught in the present specification comprises a holding member holding circuit boards with a predetermined distance therebetween. The holding member comprises a body and an optical waveguide penetrating the body. In the module taught in the present specification, an optical signal, which the one of the circuit boards sends out and the other circuit board receives, travels along the optical waveguide of the holding member.

It is preferred that the module taught in the present specification further comprises an engagement means formed on the circuit board, this engagement means holding the holding member to the circuit board by engaging with the holding member.

If the engagement means is formed in advance on the circuit board, it is possible to hold the holding member to the circuit board by means of the engagement means. If the engagement means is utilized, it is not necessary, for example, to hold the holding member to the circuit board by means of soldering, etc. As a result, the thermal load of soldering, etc. is not applied to the optical waveguide of the holding member, and the optical waveguide of the holding member can therefore maintain a satisfactory state. It is thus possible to provide stable optical communication by providing the engagement means on the module.

The technique taught in the present specification can be realized in a series of holding members for holding a plurality of circuit boards with a predetermined distance therebetween and providing an optical communication path between the circuit boards. The series of holding members comprises four types of holding members.

A first holding member includes a body, an optical waveguide, a light receiving element for converting at least a part of an optical signal traveling along the optical waveguide into an electrical signal, and a light emitting element for emitting an optical signal which is to be introduced into the optical waveguide.

A second holding member includes a body, an optical waveguide, and a light receiving element for converting at least a part of an optical signal traveling along the optical waveguide into an electrical signal.

A third holding member includes a body, an optical waveguide, and a light emitting element for emitting an optical signal which is to be introduced into the optical waveguide.

A fourth holding member includes a body and an optical waveguide.

The first, the second, the third and the fourth holding members have a common configuration, being adapted for connecting any of the holding members to any other of the holding members while holding the circuit board therebetween, and being adapted for optically connecting an end face of the optical waveguide of any of the holding members to an end face of the optical waveguide of any other of the holding members.

The first to fourth holding members are selected in accordance with their suitability for the role of the circuit board. The first holding member is selected for a circuit board which sends a signal to and receives a signal from an other circuit board. The second holding member is selected for a circuit board which receives a signal from an other circuit board. The third holding member is selected for a circuit board which sends a signal to an other circuit board. The fourth holding member is selected for a circuit board which does not send a signal to and does not receive a signal from an other circuit board.

It is possible to hold a plurality of circuit boards having a plurality of roles with a predetermined distance therebetween by utilizing a combination of the first to fourth holding members. Further, the holding members are capable of constructing optical waveguides between the plurality of circuit boards, and allowing information to be sent and received.

EFFECTS OF THE INVENTION

The optical waveguide is disposed in the holding member taught in the present specification. It is possible to cause an optical signal to travel between the circuit boards utilizing this optical waveguide. It is also possible, with the holding member taught in the present specification, to construct an optical waveguide along which an optical signal travels by holding one circuit board and the other circuit board by means of the holding member. As a result, the holding member taught in the present specification is capable of accurately transmitting information, wherein optical signals are the medium of information, between the circuit boards.

The module taught in the present specification utilizes the holding member having the optical waveguide. As a result, the module taught in the present specification is capable of accurately transmitting information between the circuit boards.

EXPLANATION OF THE NUMBERS

Figure 1:
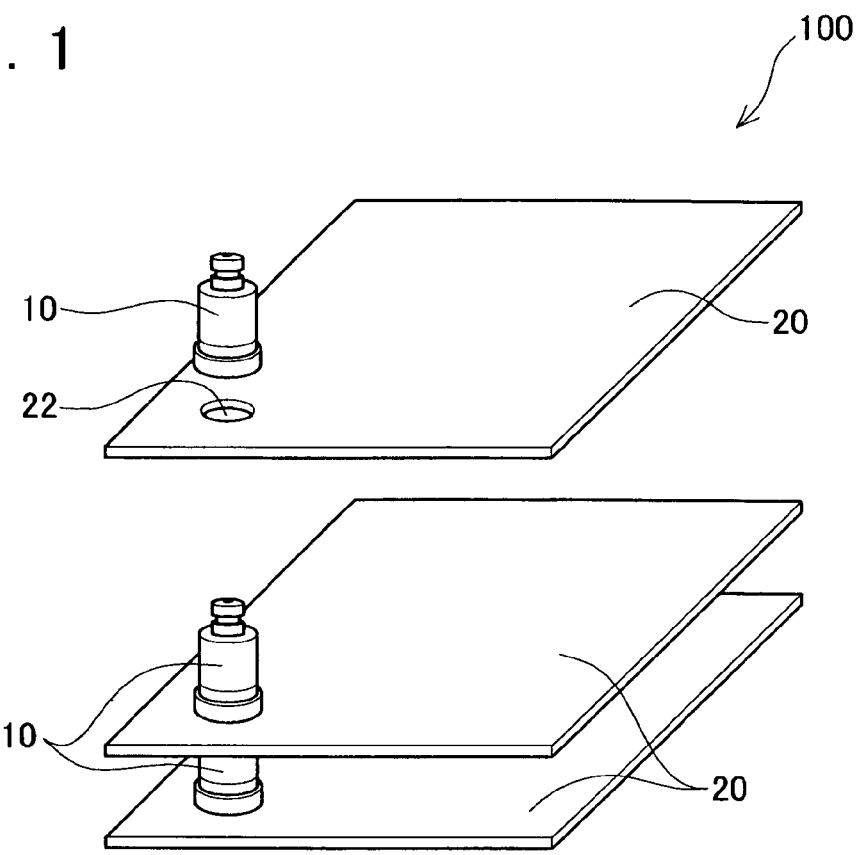
FIG. 1 schematically shows the configuration of a module.

10 Holding member
12 Optical waveguide
12a, 12b, 12c, 12d End faces of optical waveguide
14 Second portion
15 Body
16 First portion
18 Step
19 Engagement part
20 Circuit board
22 Opening
31 Power supply second terminal
32 Grounding second terminal
33 Grounding wire
34 Second signal wire
35 Grounding first terminal
36 Power supply first terminal
37 First signal wire
38 Power supply wire
40 Light emitting portion
42 Light emitting element
44, 46, 54, 56 Half mirrors
48 Second reflecting means
50 Light receiving portion
58 First reflecting means
60 Insert bore
62 Noise filter
72 Holding portion
73 Arm
74 Wiper
75 Wiping mechanism
82 Grounding third terminal
84 Light emitting element signal terminal
86 Light receiving element signal terminal
88 Power supply third terminal
91, 92, 391, 392, 393, 394 Collecting lenses
100 Module
111 Base
110 Socket
120 Guide member
122 Upper guide member
124 Lower guide member
130 Engagement part
260 Detecting means
261 First projection
263 First penetrating hole
264 First engagement member
266 Holding means
267 Second projection
268 Second penetrating hole
269 Second engagement member
301 Divided portion
302 Remaining portion
322 Peripheral edge plate
322a Female screw
323 Screw portion
323a Male screw
332 Cylindrical electrode
333 Screw portion grounding connector
334 Cylindrical electrode grounding connector
335 Cylindrical electrode power supply connector
336 Screw portion power supply connector

BEST MODE FOR CARRYING OUT THE INVENTION

Characteristics of the present invention will be given.

(First Feature) There is no particular restriction on the material utilized in the optical waveguide. Typically, plastic fiber, glass fiber, or the like is utilized. Since the distance that the optical signals travel is short, it is preferred that plastic fiber, which has outstanding working properties, is utilized.

(Second Feature) There is no particular restriction on the type of optical signals. Either single wavelength or multi wavelength optical signals may be utilized.

(Third Feature) In the case where multi wavelength optical signals are utilized, a dielectric multilayer film or a diffraction grating multiplexer, etc. can suitably be utilized in the first reflecting means and/or the second reflecting means in order to divide the plurality of wavelength components.

(Fourth Feature) Lenses of the following shapes can be utilized in the collecting lens: a convex lens (a biconvex or a plano-convex lens), a spherical lens, a cylindrical lens, etc. Further, the following can be utilized in the collecting lens: a distributed refractive index (grin) lens, a molded lens, etc.

EMBODIMENTS

First Embodiment

FIG. 1 schematically shows the configuration of a module 100. The module 100 comprises a plurality of substantially square circuit boards 20, and a plurality of substantially cylindrical holding members 10. The plurality of circuit boards 20 are stacked with a predetermined distance therebetween. The circuit boards 20 are held parallel to one another separated by the predetermined distance by means of the holding members 10. For the sake of clarity, both the circuit boards 20 and the holding members 10 prior to attachment are shown simultaneously in FIG. 1. The module 100 is housed in a housing or the like, and is utilized in an information processing device mounted in a vehicle.

The circuit board 20 comprises a circuit (not shown) consisting of electronic and electric components, etc., and an opening 22 formed near a corner. The opening 22 penetrates the circuit board 20 from a surface to an inner face thereof, and the planar shape thereof is substantially round. A part of the holding member 10 is inserted into the opening 22 of the circuit board 20. The holding member 10 passes through the opening 22 and joins an other holding member 10 in an axial direction. The opening 22 is formed in a common location in each of the plurality of circuit boards 20. As a result, the contours of the stacked plurality of circuit boards 20 conform with one another when the module 100 is seen from a plan view. The circuit boards 20 are gripped above and below by the holding members 10. Alternatively, as will be described in a later embodiment, the circuit boards 20 and the holding members 10 may be held by means of a socket.

Figure 2:
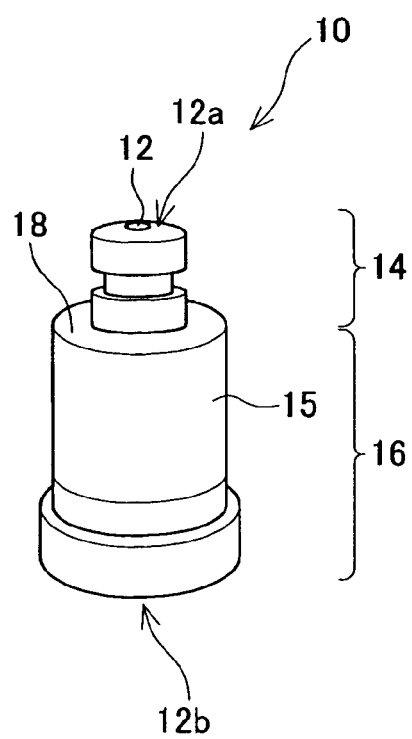
FIG. 2 schematically shows an expanded perspective view of a holding member.

FIG. 2 schematically shows an expanded perspective view of the holding member 10.

The holding member 10 comprises a body 15, and an optical waveguide 12 that penetrates the body 15. The optical waveguide 12 comprises a first end face 12a formed at one end of the optical waveguide 12 in the penetrating direction (the up-down direction on the page) and a second end face 12b formed at the other end of the optical waveguide 12 in the penetrating direction (see FIG. 3 and FIG. 4). The first end face 12a is exposed at one end face of the body 15. The second end face 12b is exposed at the other end face of the body 15. Plastic fiber is utilized in the optical waveguide 12. Since the plastic fiber is flexible, it is possible to obtain holding members 10 in a various shapes by utilizing this plastic fiber.

The body 15 of the holding member 10 comprises a first portion 16 with a larger outer diameter and a second portion 14 with a smaller outer diameter. The first portion 16 is a portion that can be considered to have a relatively large outer diameter within the entirety of the holding member 10, and the second portion 14 is a portion that can be considered to have a relatively small outer diameter within the entirety of the holding member 10. A step 18 is formed between the first portion 16 and the second portion 14 that have differing outer diameters. The outer diameter of the second portion 14 is adjusted such that it is smaller than the diameter of the opening 22 of the circuit board 20 shown in FIG. 1. The outer diameter of the first portion 16 is adjusted such that it is greater than the diameter of the opening 22 of the circuit board 20 shown in FIG. 1. The second portion 14 of the holding member 10 is therefore capable of passing through the opening 22 of the circuit board 20, and the first portion 16 of the holding member 10 is not capable of passing through the opening 22 of the circuit board 20. As a result, when the holding member 10 is inserted into the opening 22 of the circuit board 20, the inner face of the circuit board 20 makes contact with the step 18 of the holding member 10. The other holding member 10 joins with the second portion 14 that protrudes from the opening 22 of the circuit board 20 (moreover, although this will be described later, the holding members 10 fit with one another). The circuit board 20 is thus gripped by the holding members 10. The distance between the holding members 10 can be adjusted by the height of the first portion 16.

Figure 3:
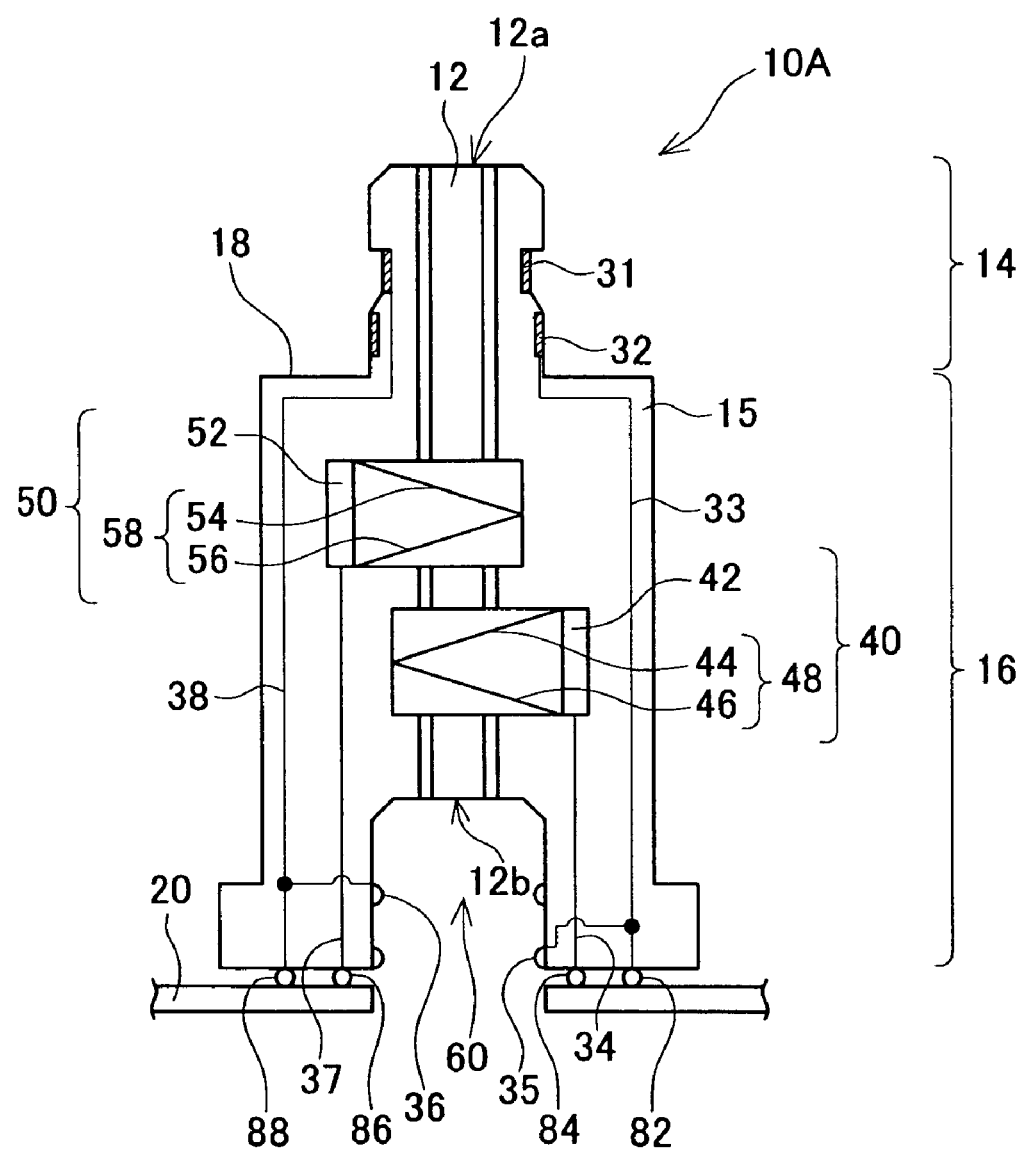
FIG. 3 schematically shows a cross-sectional view of a holding member that has a light receiving portion and a light emitting portion.
Figure 4:
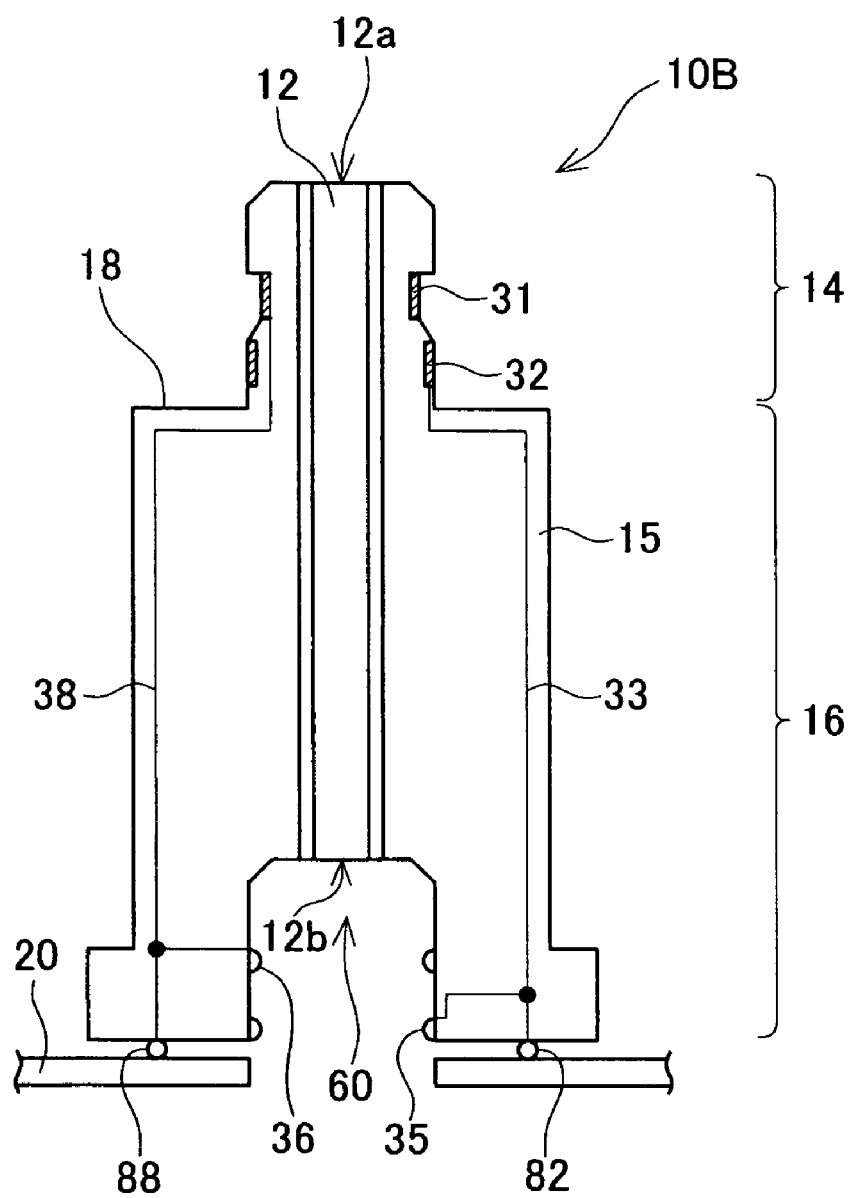
FIG. 4 schematically shows a cross-sectional view of a holding member that does not have a light receiving portion and a light emitting portion.

A plurality of types of holding member 10 are provided. FIG. 3 and FIG. 4 schematically show cross-sectional views of representative holding members 10A and 10B. The first type of holding member 10A shown in FIG. 3 comprises a light receiving portion 50 and a light emitting portion 40. The second type of holding member 10B shown in FIG. 4 does not comprise the light receiving portion 50 and the light emitting portion 40. In the case where the holding members 10 are to be distinguished by their function, the holding members 10 are numbered "10A", "10B", etc. in the present specification, and are numbered "10" in the case where the holding members are to be referred to collectively without distinguishing their function.

The module 100 of the present specification performs communication utilizing single wavelength optical signals. As a result, the wavelength of the light emitted by the light emitting portion 40 and the wavelength of the light received by the light receiving portion 50 are equal.

The first type of holding member 10A will be described first. As shown in FIG. 3, the first type of holding member 10A comprises the light receiving portion 50 and the light emitting portion 40.

The light receiving portion 50 comprises a first reflecting means 58 and a light receiving element 52. The first reflecting means 58 comprises a pair of half mirrors 54 and 56 disposed within the optical waveguide 12. The half mirrors 54 and 56 are disposed obliquely with respect to the penetrating direction of the optical waveguide 12 (the up-down direction of the page). The half mirror 54 reflects the part of the optical signal traveling along the optical waveguide 12 from the bottom side to the top side of the page, and lets the remainder of the optical signal through. The part of the optical signal reflected by the half mirror 54 is converted into an electrical signal by the light receiving element 52. The optical signal that passed through the half mirror 54 can also be received by the light receiving portion 50 disposed in the other holding member 10. The half mirror 56 reflects the part of the optical signal traveling along the optical waveguide 12 from the top side to the bottom side of the page, and lets the remainder of the optical signal through. The part of the optical signal reflected by the half mirror 56 is converted into an electrical signal by the light receiving element 52. The optical signal that passed through the half mirror 56 can also be received by the light receiving portion 50 disposed in the other holding member 10. It is possible to lead optical signals traveling in both directions within the optical waveguide 12 to the light receiving element 52 by utilizing the pair of half mirrors 54 and 56. Moreover, one of the pair of half mirrors 54 and 56 can be removed as required. In this case it is possible to receive, from among the optical signals traveling within the optical waveguide 12, only the optical signals traveling in a selected direction.

The light receiving element 52 is disposed at the outside of the optical waveguide 12, and is disposed in a position that does not physically obstruct the optical signals traveling along the optical waveguide 12. The light receiving element 52 and the optical waveguide 12 are optically joined via the pair of half mirrors 54 and 56. An optical-electrical converting device that utilizes a semiconductor is used in the light receiving element 52. A first signal wire 37 for fetching the converted electrical signal is electrically connected with the light receiving element 52. The first signal wire 37 passes through the holding member 10, extends to a bottom side face of the holding member 10, and an end part of the first signal wire 37 is exposed at the bottom side face of the holding member 10. A light receiving element signal terminal 86 is formed at the bottom side face of the holding member 10, and the end part of the first signal wire 37 and the light receiving element signal terminal 86 are electrically connected. The first signal wire 37 is electrically connected with the circuit disposed on the circuit board 20 via the light receiving element signal terminal 86. A sheet shaped metal terminal, a spring type metal terminal, etc. are utilized in the light receiving element signal terminal 86. The electrical signal converted by the light receiving element 52 is transmitted to the circuit on the circuit board 20 via the first signal wire 37 and the light receiving element signal terminal 86.

The first signal wire 37 often actually comprises two signal wires: anode and cathode. As a result, the light receiving element signal terminal 86 also often comprises two light receiving element signal terminals. For the sake of clarity in the figures, only one signal wire and one light receiving element signal terminal are shown in the present embodiment.

The light emitting portion 40 comprises a light emitting element 42 and a second reflecting means 48.

The light emitting element 42 is disposed at the outside of the optical waveguide 12, and is disposed in a position that does not physically obstruct the optical signals traveling along the optical waveguide 12. The light emitting element 42 and the optical waveguide 12 are joined via a pair of half mirrors 44 and 46. A semiconductor laser device that utilizes a semiconductor is used in the light emitting element 42. A second signal wire 34 for inputting an electrical signal from the circuit on the circuit board 20 is electrically connected with the light emitting element 42. The second signal wire 34 passes through the holding member 10, extends to the bottom side face of the holding member 10, and an end part of the second signal wire 34 is exposed at the bottom side face of the holding member 10. A light emitting element signal terminal 84 is formed at the bottom side face of the holding member 10, and the end part of the second signal wire 34 and the light emitting element signal terminal 84 are electrically connected. The second signal wire 34 is electrically connected with the circuit disposed on the circuit board 20 via the light emitting element signal terminal 84. A sheet shaped metal terminal, a spring type metal terminal, etc. are utilized in the light emitting element signal terminal 84. The electrical signal from the circuit on the circuit board 20 is input to the light emitting element 42 via the light emitting element signal terminal 84 and the second signal wire 34. The light emitting element 42 creates an optical signal in accordance with the electrical signal that has been input.

The second signal wire 34 often actually comprises two signal wires: anode and cathode. As a result, the light emitting element signal terminal 84 also often comprises two light emitting element signal terminals. For the sake of clarity in the figures, only one signal wire and one light emitting element signal terminal are shown in the present embodiment.

The second reflecting means 48 comprises the pair of half mirrors 44 and 46 disposed within the optical waveguide 12. The half mirrors 44 and 46 are disposed obliquely with respect to the penetrating direction of the optical waveguide 12 (the up-down direction of the page). The half mirror 44 reflects the optical signal from the light emitting element 42 into the optical waveguide 12. The optical signal reflected by the half mirror 44 travels along the optical waveguide 12 from the top side to the bottom side of the page. The half mirror 44 is capable of letting through at least a part of the optical signal from the other holding member 10. As a result, the optical signal from the other holding member 10 can pass through the half mirror 44, and can travel toward the other holding member 10. The half mirror 46 reflects the optical signal from the light emitting element 42 into the optical waveguide 12. The optical signal reflected by the half mirror 46 travels along the optical waveguide 12 from the bottom side to the top side of the page. The half mirror 46 is capable of letting through at least a part of the optical signal from the other holding member 10. As a result, the optical signal from the other holding member 10 can pass through the half mirror 46, and can travel toward the other holding member 10. It is possible to supply the optical signal from the light emitting element 42 into the optical waveguide 12 in both directions by utilizing the pair of half mirrors 44 and 46. Moreover, one of the pair of half mirrors 44 and 46 can be removed as required. In this case it is possible to supply, from among the optical signals traveling within the optical waveguide 12, only the optical signals traveling in a selected direction.

Unless there is a specific description, the compositional elements described below are provided in common in a plurality of types of the holding members 10. The common compositional elements will be described with reference to the holding member 10A of FIG. 3.

As shown in FIG. 3, the first portion 16 comprises an insert bore 60 that receives the second portion 14 of the other holding member 10. The insert bore 60 extends from a bottom end face of the first portion 16 along the penetrating direction of the optical waveguide 12 (the up-down direction of the page). The second end face 12b of the optical waveguide 12 is exposed at the insert bore 60. The shape of the insert bore 60 is formed so as to substantially conform to the shape of the second portion 14.

When the shape of the insert bore 60 of the first portion 16 substantially conforms to the shape of the second portion 14, the second portion 14 of the other holding member 10 can fit into the insert bore 60 of the first portion 16. Various techniques can be utilized as a joining mechanism of the insert bore 60 of the first portion 16 and the second portion 14 of the other holding member 10. For example, the following techniques for joining can be adopted: holding by means of shape, physical force such as magnetism or the like, the pressing force of a spring, etc. Further, since the insert bore 60 of the first portion 16 extends along the penetrating direction of the optical waveguide 12, when the second portion 14 of the other holding member 10 is fitted into the insert bore 60 of the first portion 16, the second end face 12b of the optical waveguide 12 that is exposed at the insert bore 60 of the first portion 16 is optically connected with the first end face 12a of the optical waveguide 12 that is exposed at the end face of the second portion 14 of the other holding member 10. The optical waveguides 12 of the holding members 10 can thereby extend across the plurality of holding members 10 when the second portion 14 of the other holding member 10 is fitted into the insert bore 60 of the first portion 16. It is thus possible to cause the optical signal to travel along the plurality of holding members 10 utilizing the joining optical waveguides 12 even in the case where a plurality of the holding members 10 have been joined together.

As shown in FIG. 3, the holding member 10 comprises a grounding wire 33 for grounding voltage, and a power supply wire 38 for power supply voltage.

One end of the grounding wire 33 is electrically connected with a grounding first terminal 35 that is formed on an inner surface which defines the insert bore 60 of the first portion 16. The other end of the grounding wire 33 is electrically connected with a grounding second terminal 32 that is formed on an outer surface of the second portion 14. The grounding first terminal 35 forms a loop in a circumference direction in the inner surface which defines the insert bore 60. The grounding second terminal 32 forms a loop in a circumference direction in the outer surface of the second portion 14. A spring type metal terminal is utilized in the grounding first terminal 35 and the grounding second terminal 32. The grounding wire 33 is disposed at the outside of the optical waveguide 12, and passes through the body 15 in an axial direction. Further, the grounding wire 33 is bifurcated, and a part of the grounding wire 33 is exposed at the bottom end face of the holding member 10. A grounding third terminal 82 is formed at the bottom end face of the holding member 10, and a part of the grounding wire 33 and the grounding third terminal 82 are electrically connected. A part of the grounding wire 33 is electrically connected with the circuit disposed on the circuit board 20 via the grounding third terminal 82. A sheet shaped metal terminal, a spring type metal terminal, etc. are utilized in the grounding third terminal 82.

One end of the power supply wire 38 is electrically connected with a power supply first terminal 36 that is formed on the inner surface which defines the insert bore 60 of the first portion 16. The other end of the power supply wire 38 is electrically connected with a power supply second terminal 31 that is formed on the outer surface of the second portion 14. The power supply first terminal 36 forms a loop in a circumference direction in the inner surface which defines the insert bore 60. The power supply second terminal 31 forms a loop in a circumference direction in the outer surface of the second portion 14. A spring type metal terminal is utilized in the power supply first terminal 36 and the power supply second terminal 31. The power supply wire 38 is disposed at the outside of the optical waveguide 12, and passes through the body 15 in an axial direction. Further, the power supply wire 38 is bifurcated, and a part of the power supply wire 38 is exposed at the bottom end face of the holding member 10. A power supply third terminal 88 is formed at the bottom end face of the holding member 10, and a part of the power supply wire 38 and the power supply third terminal 88 are electrically connected. A part of the power supply wire 38 is electrically connected with the circuit disposed on the circuit board 20 via the power supply third terminal 88. A sheet shaped metal terminal, a spring type metal terminal, etc. are utilized in the power supply third terminal 88.

The grounding first terminal 35 and the power supply first terminal 36 that are formed on the inner surface which defines the insert bore 60 of the first portion 16 are offset in the axial direction of the holding member 10. As a result, the grounding first terminal 35 and the power supply first terminal 36 are electrically isolated. The grounding second terminal 32 and the power supply second terminal 31 that are formed on the outer surface of the second portion 14 are offset in the axial direction of the holding member 10. As a result, the grounding second terminal 32 and the power supply second terminal 31 are electrically isolated.

In the holding member 10, the grounding first terminal 35 and the grounding second terminal 32 of the other holding member 10 make contact when the second portion 14 of the other holding member 10 is fitted into the insert bore 60 of the first portion 16. Further, the power supply first terminal 36 and the power supply second terminal 31 of the other holding member 10 also make contact. The grounding wires 33 of the plurality of holding members 10 are thereby electrically connected via the grounding first terminal 35 and the grounding second terminal 32 in the case where the plurality of holding members 10 have been joined together. The power supply wires 38 of the plurality of holding members 10 are also electrically connected via the power supply first terminal 36 and the power supply second terminal 31. As a result, when grounding voltage is supplied to the grounding wires 33 from the grounding first terminal 35, the grounding second terminal 32, or the grounding third terminal 82, the grounding voltage of the grounding wires 33 maintains a common amount within the plurality of joined holding members 10. This grounding voltage is supplied to the circuit board 20 via the grounding third terminal 82. It is consequently possible to supply the grounding voltage that has a common amount to the plurality of circuit boards 20. When power supply voltage is supplied to the power supply wires 38 from the power supply first terminal 36, the power supply second terminal 31, or the power supply third terminal 88, the power supply voltage of the power supply wires 38 maintains a common amount within the plurality of joined holding members 10. This power supply voltage is supplied to the circuit board 20 via the power supply third terminal 88. It is consequently possible to supply the power supply voltage that has a common amount to the plurality of circuit boards 20. Moreover, the grounding third terminal 82 and the power supply third terminal 88 may be removed from a part of the holding members 10. In this case, the circuit on the circuit board 20 can be operated by a grounding voltage and power supply voltage that are independent of the grounding wires 33 and the power supply wires 38.

FIG. 4 shows a cross-sectional view of the second type of holding member 10B. Where the configuration is the same as in the first type of holding member 10A shown in FIG. 3, the same numbers are applied thereto.

As shown in FIG. 4, the second type of holding member 10B does not have the light emitting portion 40 and the light receiving portion 50. The second type of holding member 10B is provided with the optical waveguide 12, and optical signals can travel therethrough. The grounding wire 33 and the power supply wire 38 are provided in the second type of holding member 10B, and grounding voltage and power supply voltage can thus be supplied to the circuit board 20. For example, it may be desirable to provide a circuit board 20 that is not used for communication within the module 100. In this type of case, it is preferred that the second type of holding member 10B is utilized. The second type of holding member 10B does not deliver information between the circuit boards 20. Optical signals from the other holding member 10 can bypass the second type of holding member 10B, and the second type of holding member 10B can cause the optical signals to travel to the other holding member 10. Further, in the case where grounding voltage and power supply voltage need to be supplied to the circuit board 20, the second type of holding member 10B can supply grounding voltage and power supply voltage to the circuit board 20 via the grounding third terminal 82 and the power supply third terminal 88.

Furthermore, in addition to the two types of holding member 10A and 10B, the following holding members may be utilized: a holding member that has the light receiving portion 50 and does not have the light emitting portion 40, and a holding member that does not have the light receiving portion 50 and has the light emitting portion 40. This plurality of holding members 10 can have a common exterior shape. Utilizing this plurality of types of holding members 10, it is possible to stack any of the circuit boards 20 to construct a module.

Figure 5:
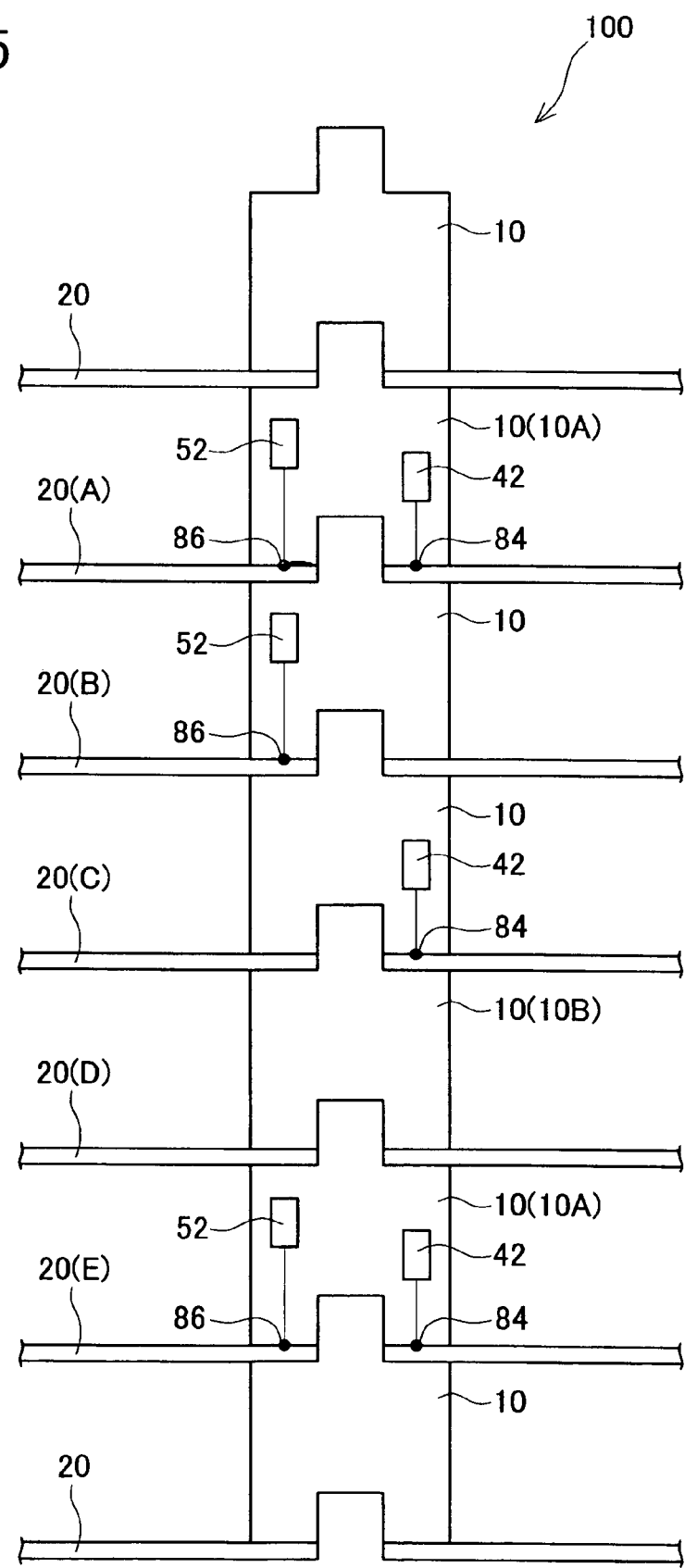
FIG. 5 schematically shows a cross-section of a module in which a plurality of types of holding member are utilized.

FIG. 5 shows an example of the module 100 which has been constructed by stacking a plurality of circuit boards 20 utilizing a plurality of types of holding members 10. In order for the types of holding member 10 to be understood, only the light receiving element 52 and the light emitting element 42 are shown in the figure.

The plurality of types of holding members 10 are selected in accordance with the functions required by the circuit boards 20.

Circuit boards 20(A) and (E) are desired to have the function of sending a optical signal to and receiving an optical signal from an other circuit board 20. In this case, the holding member 10(10A) comprising both the light receiving element 52 and the light emitting element 42 is utilized in the circuit boards 20(A) and (E).

The circuit board 20(B) is desired to have the function of receiving an optical signal from an other circuit board 20. In this case, the holding member 10 comprising only the light receiving element 52 is utilized in the circuit board 20(B).

The circuit board 20(C) is desired to have the function of sending an optical signal to an other circuit board 20. In this case, the holding member 10 comprising only the light emitting element 42 is utilized in the circuit board 20(C).

The circuit board 20(D) is not desired to have the function of sending an optical signal to or receiving an optical signal from an other circuit board 20. In this case, the holding member 10 (10B) that has neither the light receiving element 52 nor the light emitting element 42 is utilized in the circuit board 20(D).

It is possible to hold a plurality of the circuit boards 20 having various roles with a predetermined distance therebetween by utilizing a combination of the plurality of types of holding members 10. Further, the holding members 10 are capable of constructing an optical communication path between the plurality of circuit boards 20, and allowing information to be sent and received.

As described above, the holding member 10 is characterized in comprising the optical waveguide 12 along which the optical signals travel. The holding member 10 has the roles both of mechanically holding the circuit boards 20 and of functioning as the optical communication path along which the optical signals travel. The holding member 10 is capable of both mechanically holding the circuit boards 20 and of providing the optical waveguide 12 along which the optical signals travel between the circuit boards 20. Since the plurality of circuit boards 20 are stacked, the optical waveguides 12 of the holding members 10 are optically connected, and consequently an optical waveguide 12 can be provided which extends across the plurality of holding members 10 even when the plurality of holding members 10 are joined together. The light receiving portion 50 and the light emitting portion 40 disposed on the holding member 10 receive and send the optical signals that travel along the optical waveguide 12. If the optical waveguide 12 receives and sends the optical signals utilizing the light receiving portion 50 and the light emitting portion 40, it is possible to receive and send information between the plurality of circuit boards 20. Further, when the light receiving element 52 and the light emitting element 42 are disposed integrally within the holding member 10, as in the present embodiment, it is not necessary to accurately determine the positional relationship between the light receiving element 52 and the light emitting element 42. It is consequently possible to stably receive and send the optical signals between the light receiving element 52 and the light emitting element 42 when the holding members 10 have been joined together. Further, by disposing the optical waveguide 12 within the holding member 10, it is possible to maintain a stable optical communication function even if the circuit board 20 has expanded or contracted due to temperature change or the like. As a result, the holding member 10 is capable of accurately transmitting information, wherein the optical signals are the medium of information, between the plurality of circuit boards 20. It is possible to accurately transmit information between a plurality of types of circuit boards 20 by utilizing a plurality of types of holding members 10 in which the optical waveguides 12 are disposed.

The holding member 10 also comprises the following characteristics:

(1) Since the optical waveguide 12 is disposed in the holding member 10, it is not necessary to separately provide a member for the optical waveguide in the circuit board 20. As a result, using the holding member 10 allows the area of the circuit board 20 to be reduced, and allows the module 100 to be miniaturized.

(2) Using the holding member 10 allows an optical waveguide 12 to be presented in which only one system penetrates a plurality of the holding members 10. As a result, using the holding member 10 allows the area of the circuit board 20 to be reduced, and allows the module 100 to be miniaturized. Further, the structure for optical communication can be simplified by having the optical waveguide 12 be only one system.

(3) The circuit board 20 is gripped between and held above and below by the holding members 10. Since the opening 22 of the circuit board 20 is formed in a substantially circular shape and the holding member 10 that is inserted into this opening 22 is formed in a substantially circular shape, it is possible to rotate the circuit board 20 around the axis of the holding member 10 by adjusting the gripping force. As a result, it is possible to adjust the position of the circuit board 20 with respect to the axis of the holding member 10. The positional relationships of the circuit boards 20 in the direction of stacking can thereby be made to conform accurately with one another.

The following variants can also be considered.

Figure 6:
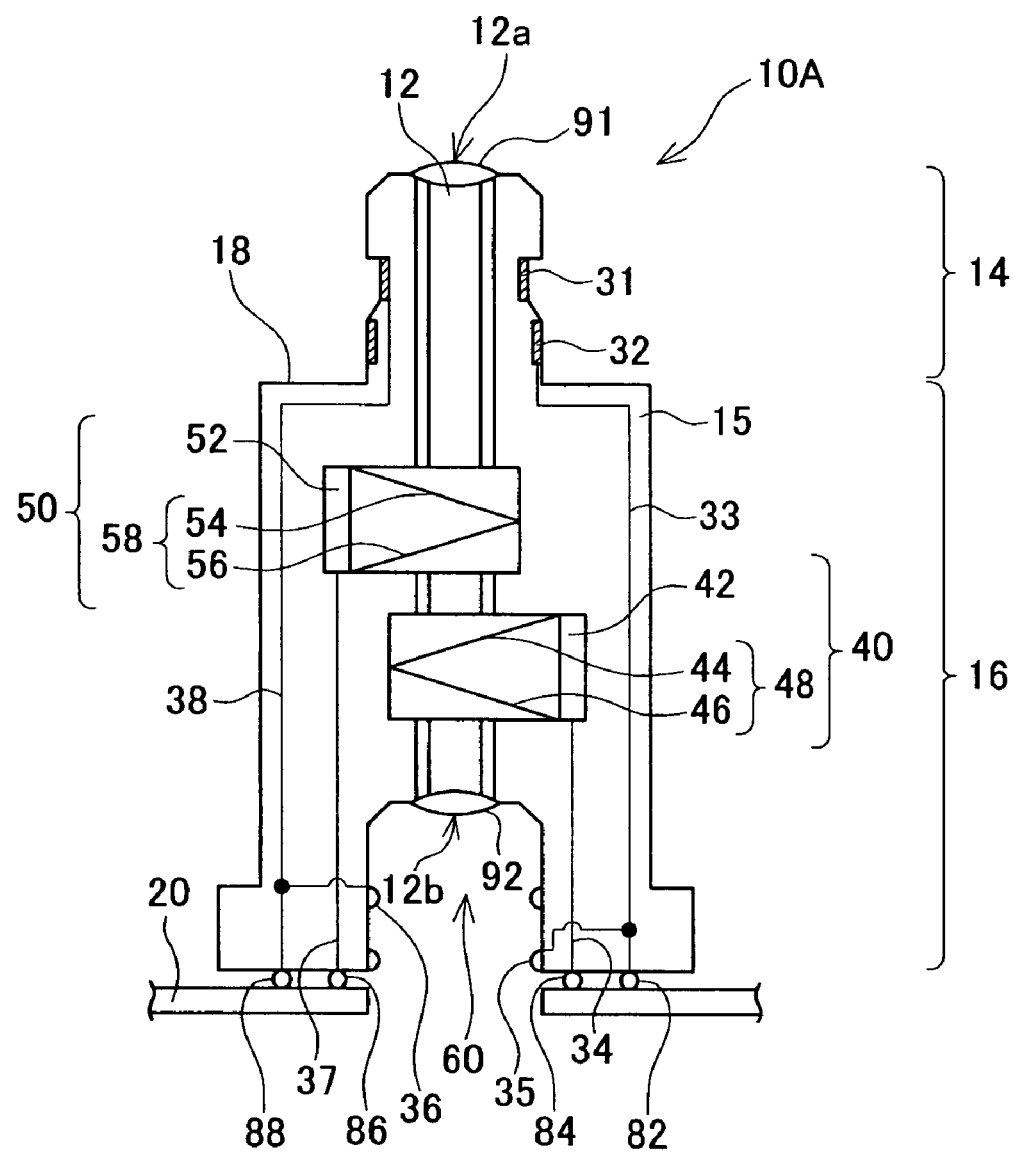
FIG. 6 shows a variant of the holding member of FIG. 3.
Figure 7:
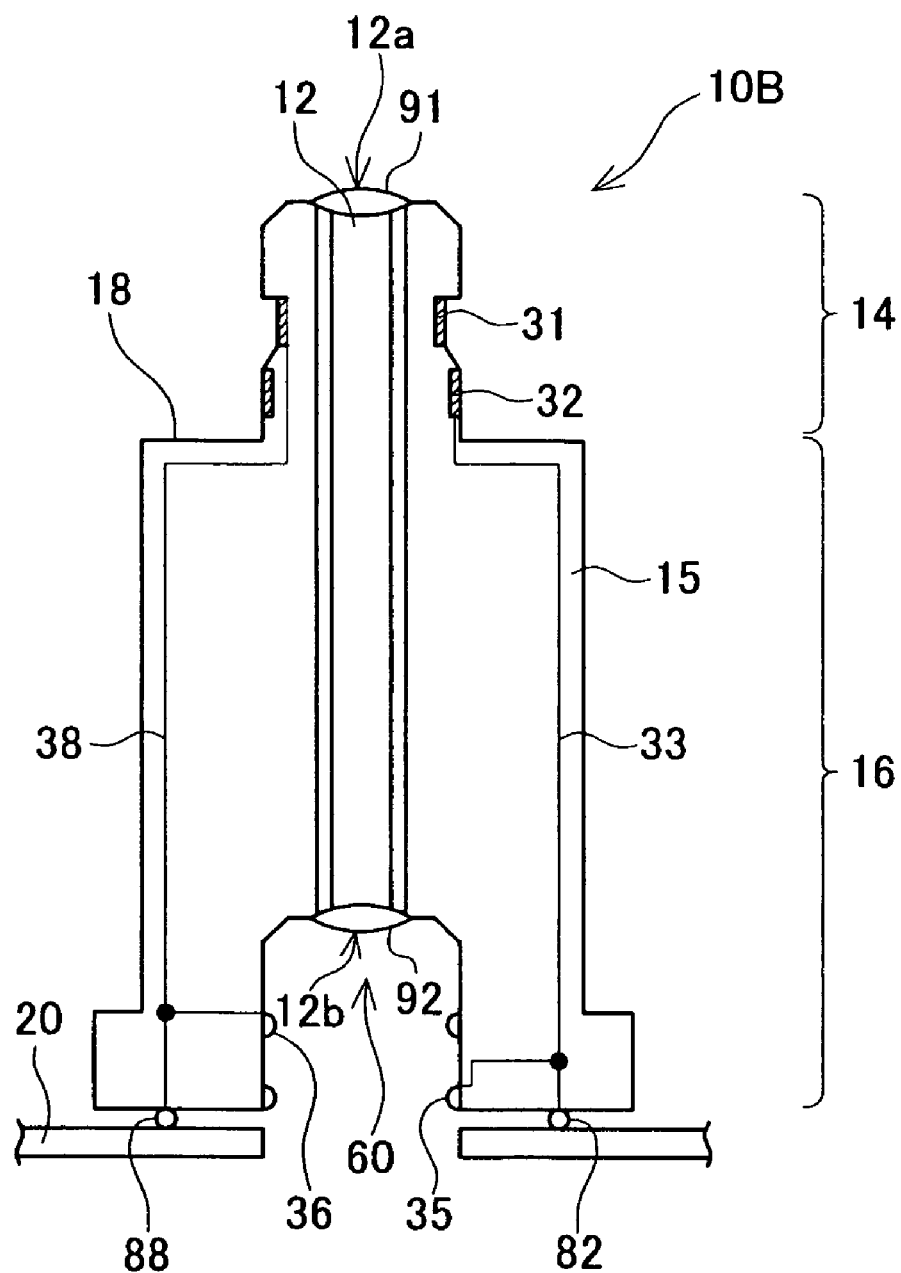
FIG. 7 shows a variant of the holding member of FIG. 4.

(4) FIG. 6 and FIG. 7 schematically show cross-sectional views of a variant of the holding member 10A and a variant of the holding member 10B. The optical waveguide 12 of the holding member 10A and the holding member 10B both comprise collecting lenses 91 and 92 at the first end face 12a and the second end face 12b.

In the case where a plurality of the circuit boards 20 are held, an optical waveguide is constructed that extends across the plurality of holding members 10 by means of optically connecting the optical waveguide 12 of each of the holding members 10. If the collecting lens 91 is disposed at the first end face 12a of the optical waveguide 12 of the holding member 10, this collecting lens 91 can prevent an optical signal radiated from the first end face 12a of the optical waveguide 12 from widening spatially even if a space is formed between the holding member 10 and the other holding member 10. As a result, the collecting lens 91 can cause the optical signal to travel efficiently from the first end face 12a to the second end face 12b of the other holding member 10. Alternatively, if the collecting lens 92 is disposed at the second end face 12b of the optical waveguide 12 of the other holding member 10, this collecting lens 92 can prevent an optical signal radiated from the second end face 12b of the optical waveguide 12 from widening spatially. The optical signal can be caused to travel efficiently from the second end face 12b to the first end face 12a of the holding member 10. If the collecting lenses 91 and 92 are disposed at the first end face 12a and the second end face 12b, optical signals that are traveling in both directions along the optical waveguide 12 can be caused to travel efficiently between the first end face 12a and the second end face 12b.

Figure 8:
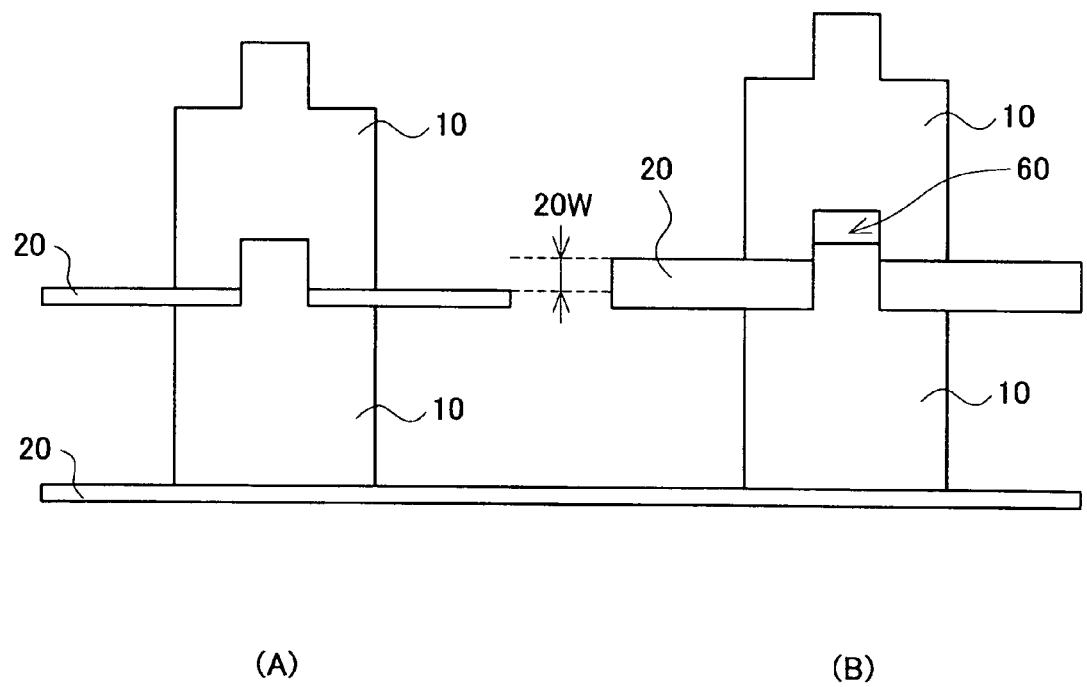
FIG. 8(A) shows a state where a holding member fits with an other holding member in the case where a circuit board is thin.
FIG. 8(B) shows a state where a holding member fits with an other holding member in the case where a circuit board is thick.

The collecting lenses 91 and 92 are useful in, for example, the case shown in FIG. 8. Examples are shown in FIG. 8 in which there is a difference 20 W in the thickness of the circuit board 20. As shown in FIG. 8(A), the holding member 10 fits satisfactorily with the other holding member 10 in the case where the circuit board 20 is thin, and a space is not formed between the optical waveguides 12 thereof. These optical waveguides 12 have satisfactory optical communication. However, as shown in FIG. 8(B), a space of the insert bore 60 is formed between the holding member 10 and the other holding member 10 when a thick circuit board 20 is to be held utilizing the same holding members 10. The optical waveguide 12 is not formed in the space of the insert bore 60. As a result, unless a countermeasure is devised, the optical signal radiated from the first end face 12a or the second end face 12b of the optical waveguide 12 widens spatially within the space of the insert bore 60, and a part of the radiated optical signal does not reach the other end face. Consequently, unless a countermeasure is devised, there is the problem that the signal strength of the optical signal decreases. However, the collecting lenses 91 and 92 are disposed at the first end face 12a and the second end face 12b in the present embodiment. As a result, the collecting lenses 91 and 92 prevent the optical signal from widening spatially in the space of the insert bore 60, and the optical signal can travel efficiently from the one end face to the other end face. It is thus possible, by providing the collecting lenses 91 and 92, to utilize only one type of holding member 10 to deal with a plurality of the circuit boards 20 having differing thicknesses. As a result, the number of components can be reduced when a module is to be constructed, and costs can be greatly reduced.

Further, it is preferred that focal distance can be changed in the collecting lenses 91 and 92. For example, there may be a mechanism for changing focal distance by means of combining a plurality of collecting lenses. Alternatively, collecting lenses may be adopted in which the curvature of the collecting lens can be changed. When the focal distance of the collecting lenses 91 and 92 can be changed, it is possible for the satisfactory travel of optical signals to be realized by changing the focal distance in accordance with the size of the space of the insert bore 60. For example, if the space of the insert bore 60 becomes too large, the optical signal radiated from the end face widens spatially before reaching the other end face, and there is thus a deterioration in the travel of the optical signal. This case can be countered by increasing the focal distance.

Further, the following applications can also be considered.

(5) Since both the light emitting portion 40 and the light receiving portion 50 are provided in the holding member 10, the optical signal from the light emitting portion 40 can be monitored by the light receiving portion 50 provided in the same holding member 10. Feedback control of the light emitting portion 40 is thus possible based on the state of the light emitting portion 40 that has been monitored by the light receiving portion 50. In this case, feedback control can be made possible by providing a processing circuit of a microcomputer, etc. connected between the light emitting portion 40 and the light receiving portion 50 within the holding member 10.

(6) In the case where the light receiving portion 50 and the light emitting portion 40 are provided in the same holding member 10, the light emitting portion 40 may create an optical signal upon the cue that the light receiving portion 50 has obtained the optical signal from the other holding member 10. By joining the light receiving portion 50 and the light emitting portion 40, it is possible to amplify the optical signal from the other holding member 10, and cause the optical signal to travel toward the other holding member 10. For example, in the case where a plurality of the circuit boards 20 are stacked, it is possible to compensate for energy loss of the optical signal, and to cause the optical signal to travel toward the plurality of circuit boards 20. Further, in the case where plastic fiber is utilized in the optical waveguide 12 (plastic fiber usually having a greater energy loss than glass fiber), it is possible to compensate for energy loss of the optical signal, and to cause the optical signal to travel toward the plurality of circuit boards 20. In this case, it is possible to adjust the timing with which the light emitting portion 40 creates the optical signals between the light receiving portion 50 and the light emitting portion 40 by providing a processing circuit of a microcomputer, etc. connected between the light emitting portion 40 and the light receiving portion 50 within the holding member 10.

Further, instead of the structure in the present embodiment, the following structures can also be adopted.

(7) In the case where the light receiving portion 50 and the light emitting portion 40 are provided in the same holding member 10, the light emitting portion 40 may create an optical signal having a differing wavelength upon the cue that the light receiving portion 50 has obtained the optical signal from the other holding member 10. It is possible to add information about the state of communication by creating an optical signal that has a differing wavelength. For example, it is possible to add the information that an optical signal has been received from a predetermined circuit board 20.

(8) The optical signal may travel in only a selected direction along the optical waveguide 12. In this case, it is preferred that an optical mirror that totally reflects is utilized in the reflecting means. Further, in this case it is preferred that, when the light receiving portion 50 and the light emitting portion 40 are provided in the same holding member 10, the light emitting portion 40 creates an optical signal upon the cue that the light receiving portion 50 has obtained the optical signal from the other holding member 10. Further, in this case, it is preferred that one end and an other end of the optical waveguide 12 extending across the joined holding members 10 are optically connected, with a loop-shaped optical waveguide being constructed. Information can thus be sent and received between the plurality of circuit boards 20 even though the optical signal travels only in the selected direction along the optical waveguide 12. Further, by moving the light receiving portion 50 and the light emitting portion 40, it is possible to compensate for energy loss of the optical signal, and to cause the optical signal to travel toward the plurality of circuit boards 20.

Second Embodiment

Figure 9:
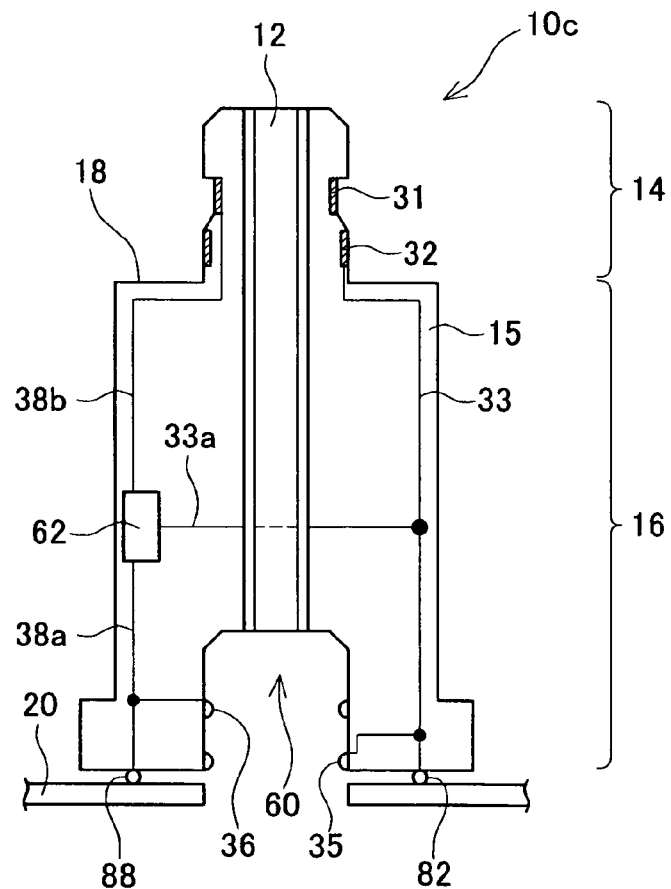
FIG. 9 schematically shows a cross-sectional view of a holding member that has a noise filter.

FIG. 9 shows a cross-sectional view of a holding member 10C of a second embodiment. This example is equivalent to a variant of the second type of holding member 10B of the first embodiment. However, this technical concept can also be applied to the first type of holding member 10A of the first embodiment, or to another type of holding member 10. Moreover, where the configuration is the same in FIG. 9 as in the holding members 10A and 10B of the first embodiment, the same numbers are applied thereto and a description thereof is omitted.

The holding member 10C comprises a noise filter 62. The noise filter 62 is electrically connected with power supply wires 38a and 38b for power supply voltage, and a grounding bifurcating wire 33a that extends from the grounding wire 33 for grounding voltage. The noise filter 62 removes wavelength components of the high frequency range that constitute noise, and creates stable power supply voltage.

Figure 10:
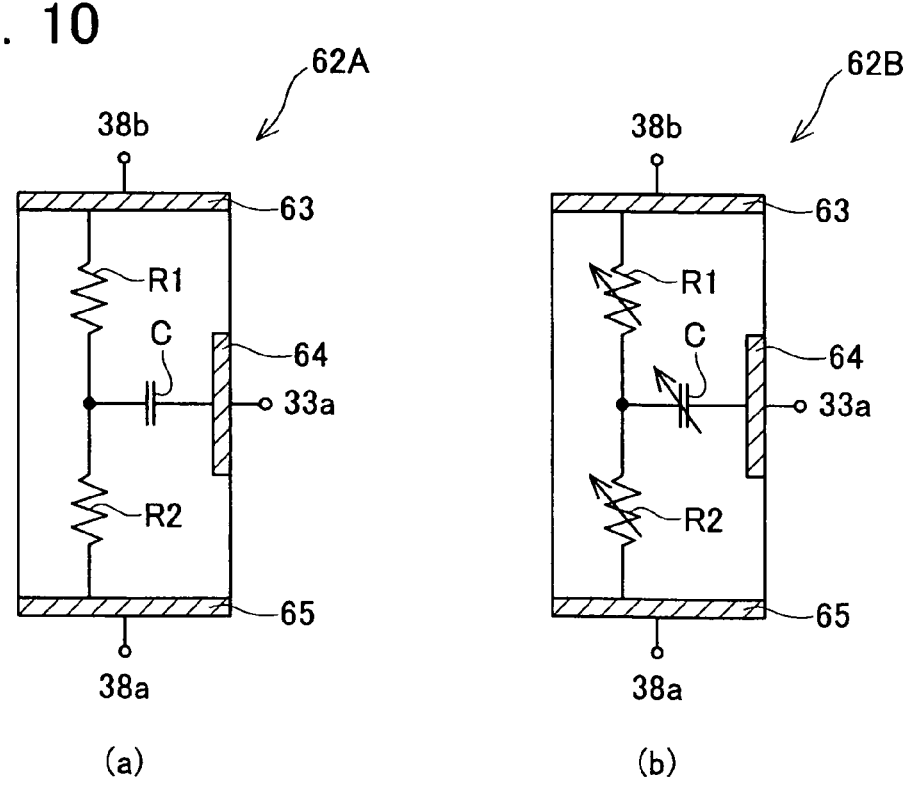
FIG. 10(a) shows an example of a circuit diagram of the noise filter.
FIG. 10(b) shows another example of a circuit diagram of the noise filter.

As shown in FIG. 10, two types of circuit diagrams of the noise filter 62 are proposed in the present embodiment. FIG. 10(a) shows a circuit diagram of a noise filter 62A in which cut off frequency is fixed. FIG. 10(b) shows a circuit diagram of a noise filter 62B in which cut off frequency can be adjusted.

As shown in FIG. 10(a), the noise filter 62A is a low pass filter, and comprises a capacitor C, and resistors R1 and R2. Ferrite can be utilized as a resistor body in the resistors R1 and R2. One end of the capacitor C is connected with a connecting terminal 64 that is connected with the grounding bifurcating wire 33a. The other end of the capacitor C is connected with one end of each of the resistors R1 and R2. The other end of the resistor R1 is connected with a power supply terminal 63 that is connected with the power supply wire 38b. The other end of the resistor R2 is connected with a power supply terminal 65 that is connected with the power supply wire 38a.

The noise filter 62A shown in FIG. 10(a) can remove frequency components that are higher than a cut off frequency that is determined based on the capacity of the capacitor C and the resistance of the resistors R1 and R2. High frequency range noise can thereby be removed, and stable power supply voltage can be created.

In the noise filter 62B shown in FIG. 10(b), a capacitor C in which capacity can be adjusted and resistors R1 and R2 in which resistance can be adjusted are utilized. The cut off frequency of the noise filter 62B can thus be adjusted as desired. It is possible to adjust the high frequency range of noise whose removal is desired by adjusting the cut off frequency. Moreover, it is not necessary that the capacitor C and the resistors R1 and R2 shown here all have changeable capacity or resistance respectively, and instead the cut off frequency may be adjusted by changing any one thereof.

Third Embodiment

Figure 11:
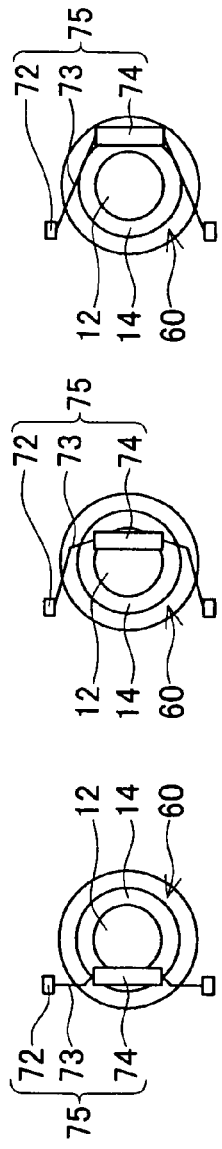
FIG. 11 shows the operation of a wiping mechanism.
Figure 11:
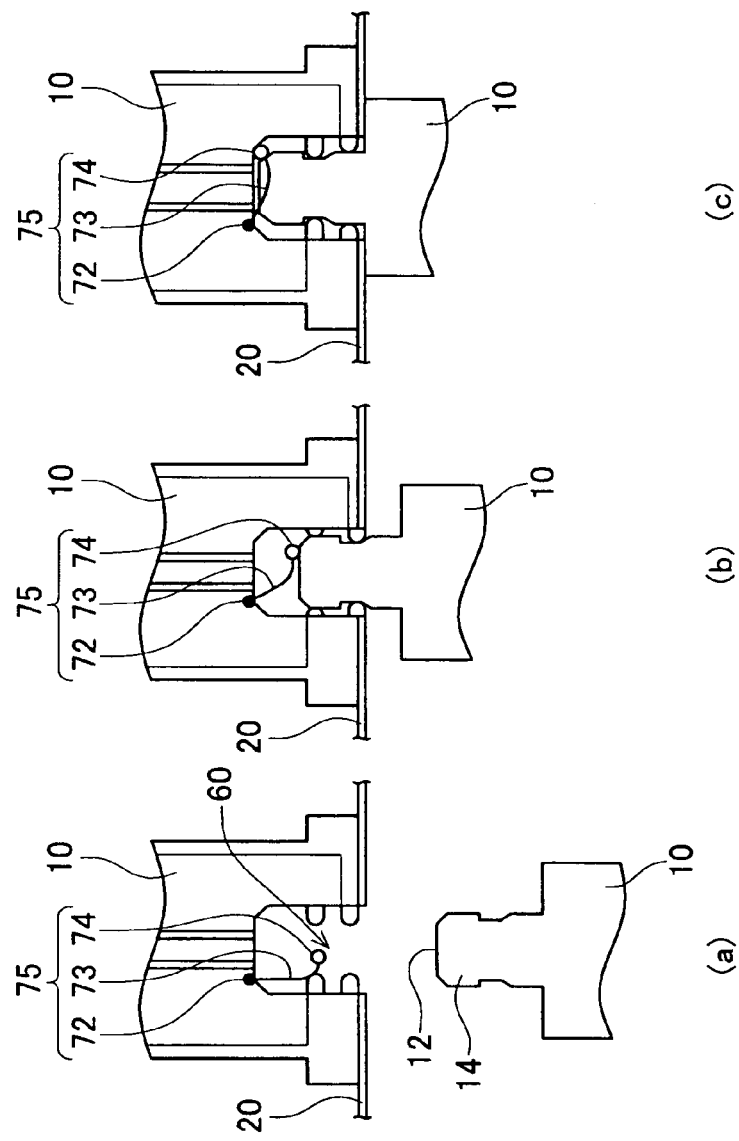

FIG. 11 schematically shows a wiping mechanism 75 disposed in the insert bore 60 of the holding member 10.

The wiping mechanism 75 comprises a wiper 74, an arm 73, and a holding portion 72 that holds the arm 73 at the inner surface which defines the insert bore 60. The wiper 74 comprises cylindrically shaped antistatic high density urethane and minute split fiber covering a surface thereof. The arm 73 supports the wiper 74 from the inner surface of the insert bore 60, and enables the wiper 74 to move. A plate spring is utilized in the arm 74, whereby elastic deformation is possible.

FIGS. 11(a), (b), and (c) show the operation of the wiping mechanism 75 over time when the second portion 14 of the other holding member 10 is fitted into the insert bore 60. So that the positional relationship in an axial direction of the wiping mechanism 75, the insert bore 60, the second portion 14 of the other holding member 10, and the end face of the optical waveguide 12 can easily be understood, a schematic plan view is shown at the upper part of FIGS. 11(a), (b), and (c).

As shown in FIG. 11(a), the wiper 74 is disposed, from a plan view, at a peripheral edge part of the optical waveguide 12 of the other holding member 10 at a stage prior to the second portion 14 of the other holding member 10 being fitted into the insert bore 60.

As shown in FIGS. 11(b) and (c), when the second portion 14 of the other holding member 10 is fitted into the insert bore 60, a top end face of the other holding member 10 makes contact with the wiper 74. The arm 73 receives force from the other holding member 10 being pushed in toward the upper direction of the page, and deforms elastically. The wiper 74 moves while making contact with a top end face of the optical waveguide 12 that is exposed at a top end face of the second portion 14. At this juncture, the wiper 74 moves from one peripheral edge part toward the other peripheral edge part of the optical waveguide 12, moving along the entire surface of the optical waveguide 12. Impurities adhering to the top end face of the optical waveguide 12 that is exposed at the top end face of the second portion 14 are thus removed when the second portion 14 of the other holding member 10 is fitted into the insert bore 60. As a result, it is possible to avoid noise being superimposed upon the optical signal by impurities, etc. adhering to the top end face of the optical waveguide 12 that is exposed at the top end face of the second portion 14.

Further, when the second portion 14 of the other holding member 10 is fitted into the insert bore 60, the wiping mechanism 75 retreats from the interior to the exterior of the optical waveguide 12. The wiping mechanism 75 thus does not hinder the passage of the optical signal. Consequently, it is possible to avoid noise being superimposed upon the optical signal passing along the optical waveguide 12.

Since the holding member 10 transmits the optical signal utilizing the optical waveguide 12 that penetrates the body 15 of the holding member 10, it is possible to prevent dust, etc. from entering the optical waveguide 12 from the exterior. With the holding member 10, impurities on the top end face of the optical waveguide 12 exposed at the top end face of the second portion 14 can be removed by the wiping mechanism 75 when the holding members 10 are fitted together, and furthermore it is possible thereafter to prevent dust, etc. from entering the optical waveguide 12. When the holding member 10 of the present embodiment is utilized, it is possible to reduce the noise superimposed upon the optical signal from impurities, dust, etc. when the holding member taught in the present specification is utilized, and accurate optical signals can be transmitted.

Fourth Embodiment

Figure 12:
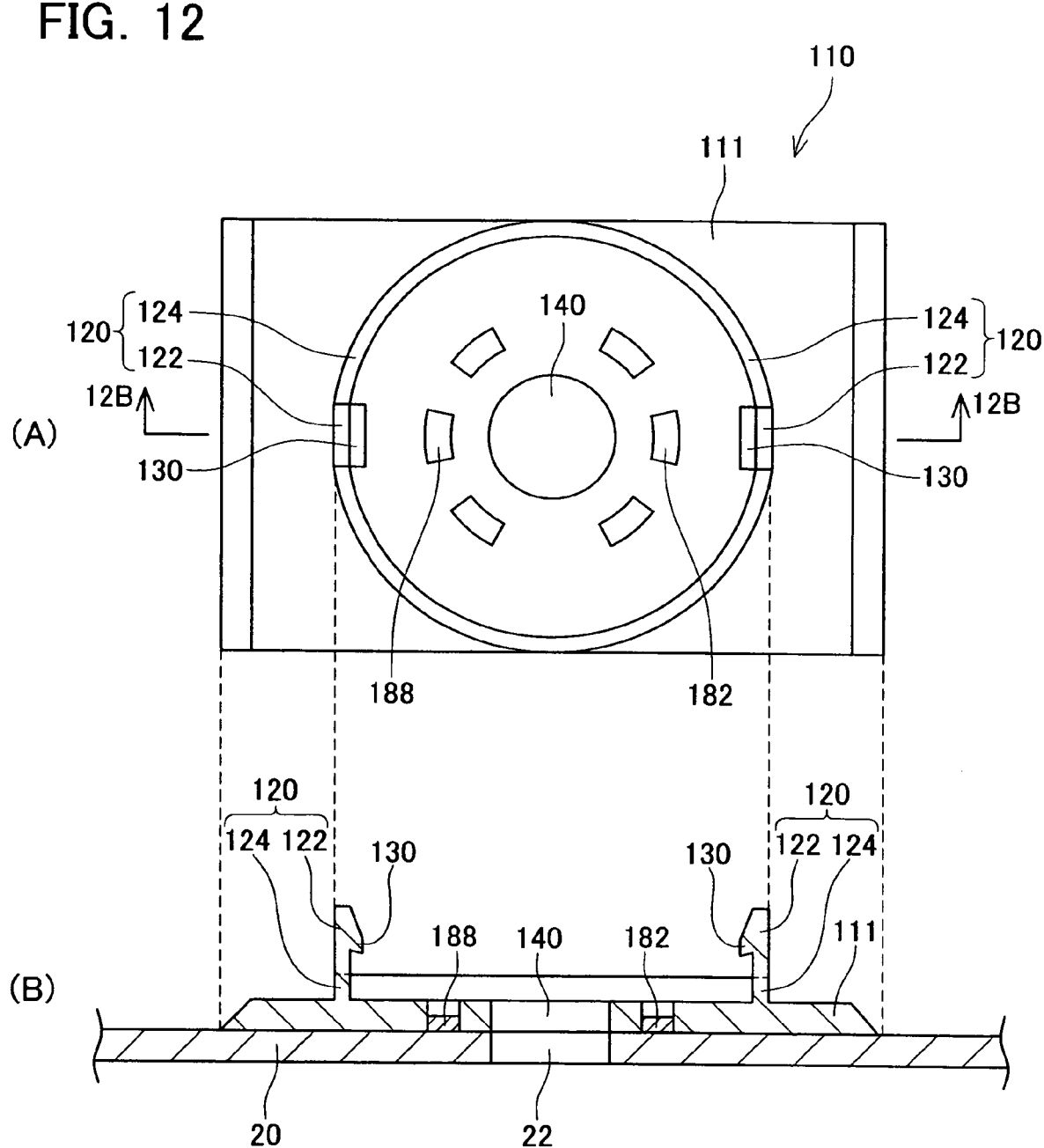
FIG. 12(A) shows a plan view of a socket.
FIG. 12(B) shows a cross-sectional view of the socket.
Figure 13:
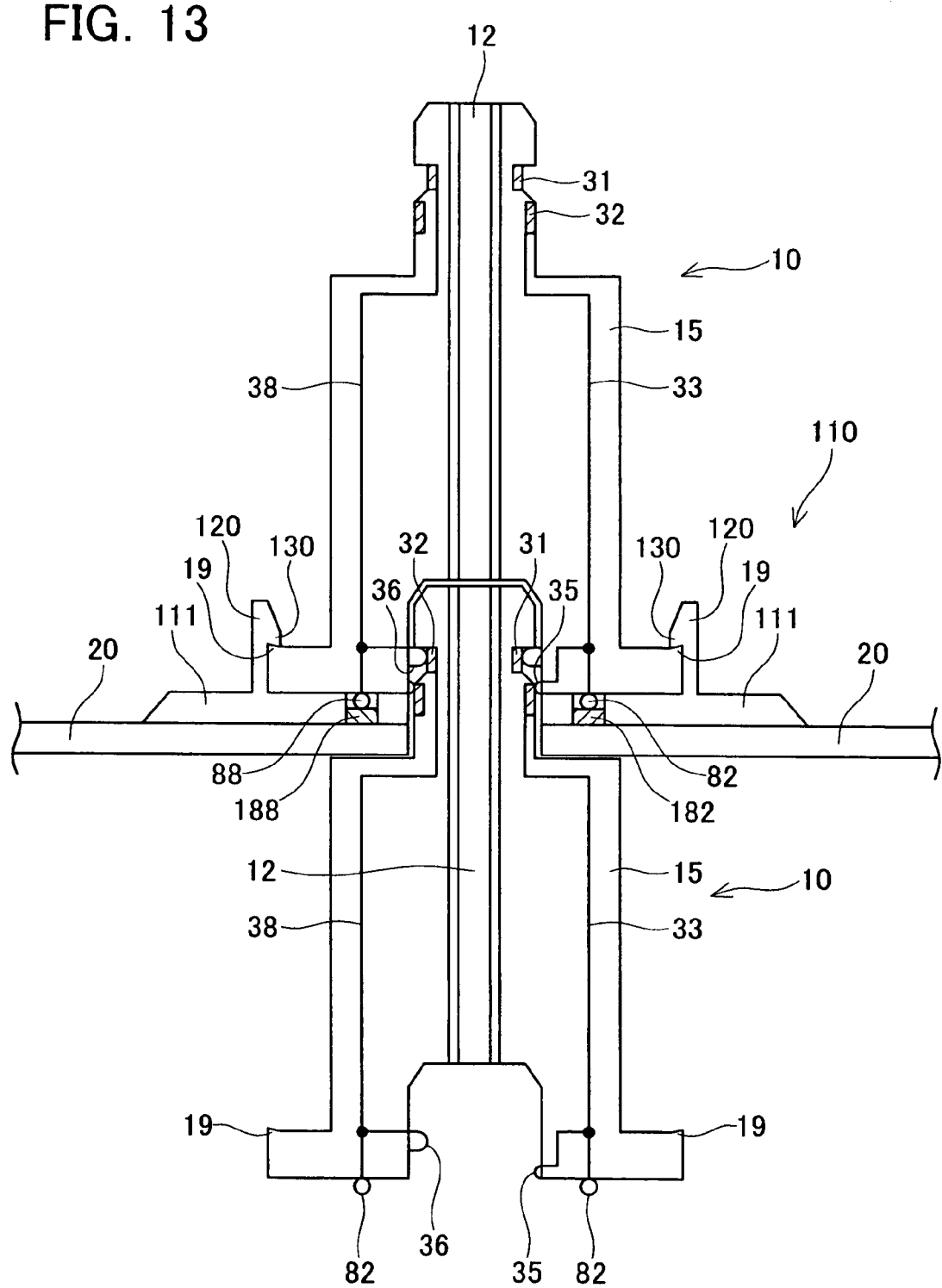
FIG. 13 shows a state where the circuit board and the holding member are held by means of the socket.

FIG. 12 schematically shows a socket 110 (an example of an engaging means) formed on the circuit board 20. FIG. 12(A) shows a plan view of the socket 110. FIG. 12(B) shows a cross-sectional view of the socket 110, and is a cross-sectional view corresponding to the line 12B-12B of FIG. 12(A). FIG. 13 shows a state where the circuit board 20 and the holding member 10 are held by means of the socket 110. Further, the holding member 10 of FIG. 13 has a configuration essentially the same as that of the holding member 10 of the first embodiment and the second embodiment. Where the configuration has the same operation and effects as in the first embodiment and the second embodiment, the same numbers are applied thereto, and a description thereof is omitted.

As shown in FIG. 12, the socket 110 comprises a base 111 fixed to the top of the circuit board 20. The base 111 comprises a penetrating hole 140 that corresponds to the opening 22 of the circuit board 20. The contours of the opening 22 of the circuit board 20 conform to the contours of the penetrating hole 140 of the base 111, and the second portion 14 of the holding member 10 can be inserted therein. The socket 110 further comprises a guide member 120 that extends in a vertical direction from the base 111. The guide member 120 comprises a lower guide member 124 and two upper guide members 122 that extend in a vertical direction from a part of the lower guide member 124. The lower guide member 124 forms a loop around the periphery of the penetrating hole 140 of the base 111. The two upper guide members 122 are disposed in symmetrical positions facing the penetrating hole 140 of the base 111. The inner diameter of the lower guide member 124 is formed so as to substantially conform to the outer diameter of the first portion 16 of the holding member 10. Consequently, as shown in FIG. 13, the first portion 16 of the holding member 10 is held in a state where it makes contact with an inner surface of the lower guide member 124. An engagement part 130 is formed at an anterior end of the upper guide members 122. The engagement parts 130 engage with an engagement part 19 formed on the holding member 10.

The socket 110 comprises a plurality of connecting terminals 182 and 188 that are formed so as to pass through the base 111. Plate shaped metal terminals, spring type metal terminals, etc. are utilized in the connecting terminals 182 and 188. The connecting terminals 182 and 188 of the present embodiment are the grounding connecting terminal 182 and the power supply connecting terminal 188. As shown in FIG. 13, the grounding connecting terminal 182 is electrically connected with the grounding third terminal 82 and the circuit on the circuit board 20. The power supply connecting terminal 188 is electrically connected with the power supply third terminal and the circuit on the circuit board 20. Moreover, in the case where the light emitting portion 40 or the light receiving portion 50 is disposed in the holding member 10, other connecting terminals are utilized to electrically connect the light emitting element signal terminal 84 or the light receiving element signal terminal 86 with the circuit on the circuit board 20.

The socket 110 and the circuit board 20 are fixed together by soldering or the like. If the socket 110 is fixed in advance on the circuit board 20, the holding member 10 can be fixed onto the circuit board 20 by the engagement parts 130 of the socket 110 engaging with the engagement part 19 of the holding member 10. If the socket 110 is utilized, it is for example not necessary to fix the holding member 10 to the circuit board 20 by means of soldering or the like. As a result, the thermal load of soldering, etc. is not applied to the optical waveguide 12 of the holding member 10. In particular, in the case where the light emitting element 42 or the light receiving element 52 are disposed in the holding member 10, the light emitting element 42 or the light receiving element 52 may not function properly due to thermal load. If the socket 110 is utilized, the optical waveguide 12, the light emitting element 42, and the light receiving element 52 of the holding member 10 are maintained in a satisfactory state. It is thus possible to provide stable optical communication by utilizing the socket 110.

Fifth Embodiment

Figure 14:
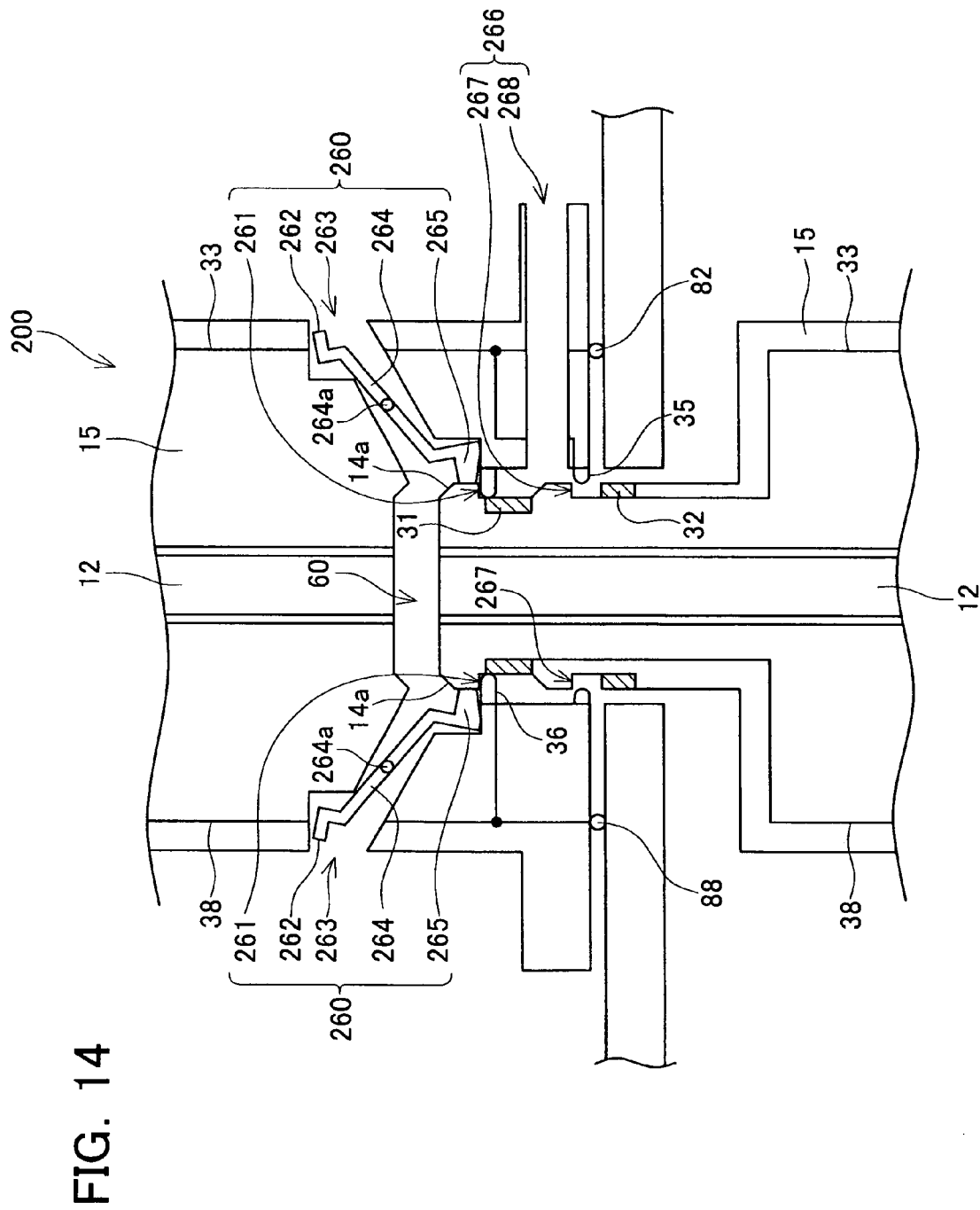
FIG. 14 schematically shows a cross-sectional view of a holding member that has a detecting means and a holding means.
Figure 15:
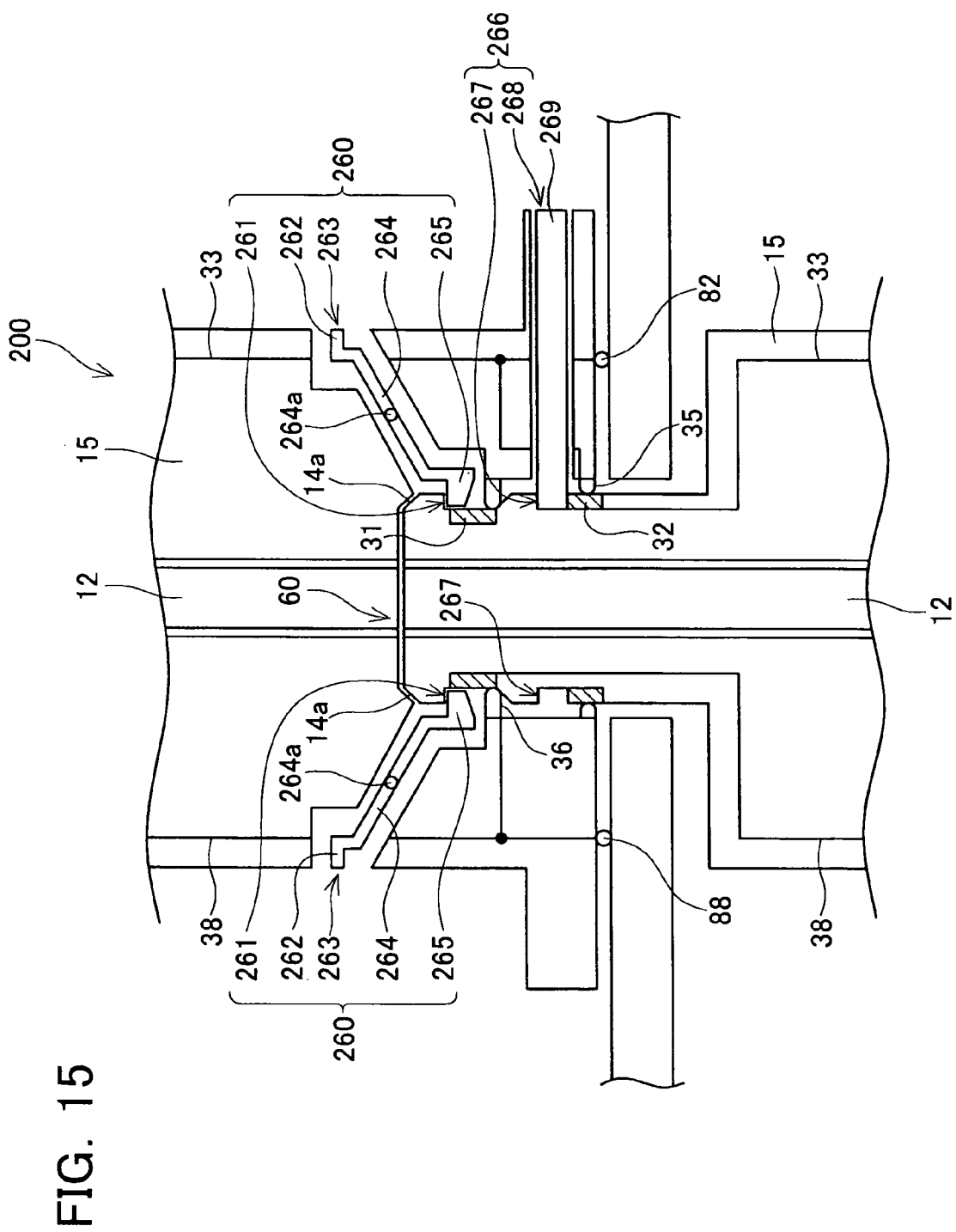
FIG. 15 schematically shows a cross-sectional view of a holding member that has a detecting means and a holding means.

FIG. 14 and FIG. 15 schematically show cross-sectional views of essential components of a holding member 200. FIG. 14 shows a stage in which the second portion 14 of an other holding member 200 is being inserted into an insert bore 60 of the holding member 200. FIG. 15 shows a stage in which the second portion 14 of the other holding member 200 has been inserted to a predetermined position in the insert bore 60 of the holding member 200. Moreover, where the configuration has the same operation and effects as in the other embodiments, the same numbers are applied thereto, and a description thereof is omitted.

The body 15 of the holding member 200 comprises a detecting means 260 and a holding means 266. When the second portion 14 of the other holding member 200 has been inserted into the insert bore 60 of the holding member 200, the detecting means 260 detects that the second portion 14 has been inserted to the predetermined position in the insert bore 60. The holding means 266 holds the holding member 200 and the other holding member 200 at that predetermined position. Various means can be adopted in the detecting means 260. The present embodiment is an example in which it is detected that the holding member 200 and the other holding member 200 are disposed in the predetermined position by engaging the holding member 200 and the other holding member 200 by means of a special mechanism. Instead of this example, various assemblies can be adopted in the detecting means utilizing physical force such as magnetism, etc., or utilizing the pressing force of a spring, etc.

In FIG. 14 and FIG. 15, only a part of the holding member 200 and a part of the other holding member 200 are shown. For this reason, the compositional elements of the detecting means 260 are shown divided across the holding member 200 and the other holding member 200. However, when the part of the holding member 200 and a part of the other holding member 200 are joined together, this can be considered to form one holding member 200. This one holding member 200 is actually provided with a part of the compositional elements of the holding member 200 and a part of the compositional elements of the other holding member 200 that are shown in FIG. 14 and FIG. 15. Consequently, the one holding member 200 is provided with all of the compositional elements of the detecting means 260. Similarly, the one holding member 200 is provided with all of the compositional elements of the holding means 266. The compositional elements of both these means will be described below based on the aforementioned concept.

The detecting means 260 is formed in at least a part of the first portion 16 of the body 15, and comprises a first penetrating hole 263 that extends from an outer surface of the first portion 16 to the insert bore 60. The detecting means 260 comprises a first projection 261 formed upon at least a portion of the outer surface of the second portion 14. The detecting means 260 further comprises a first engagement member 264 disposed within the first penetrating hole 263, one side end 262 of the first engagement member 264 being exposed at the outer surface of the first portion 16, and an other side end 265 of the first engagement member 264 protruding into the insert bore 60. A supporting rod 264a is disposed at approximately the central portion of the first engagement member 264. The supporting rod 264a extends through the first engagement member 264, and both ends thereof are fixed to an inner surface that defines the first penetrating hole 263. The supporting rod 264a supports the first engagement member 264 in a manner allowing rotation.

The holding means 266 comprises a second penetrating hole 268 formed in at least a portion of the first portion 16 of the body 15, and extending from the outer surface of the first portion 16 to the insert bore 60. The second penetrating hole 268 receives a second engagement member 269. The second engagement member 269 is not a part of the elements forming the body 15. The holding means 266 comprises a second projection 267 formed upon at least an other portion of the outer surface of the second portion 14. When the first engagement member 264 and the first projection 261 of the detecting means 260 are in an engaged state, the second projection 267 of the holding means 266 engages with the second engagement member 269 that has passed through the second penetrating hole 268.

Figure 16:
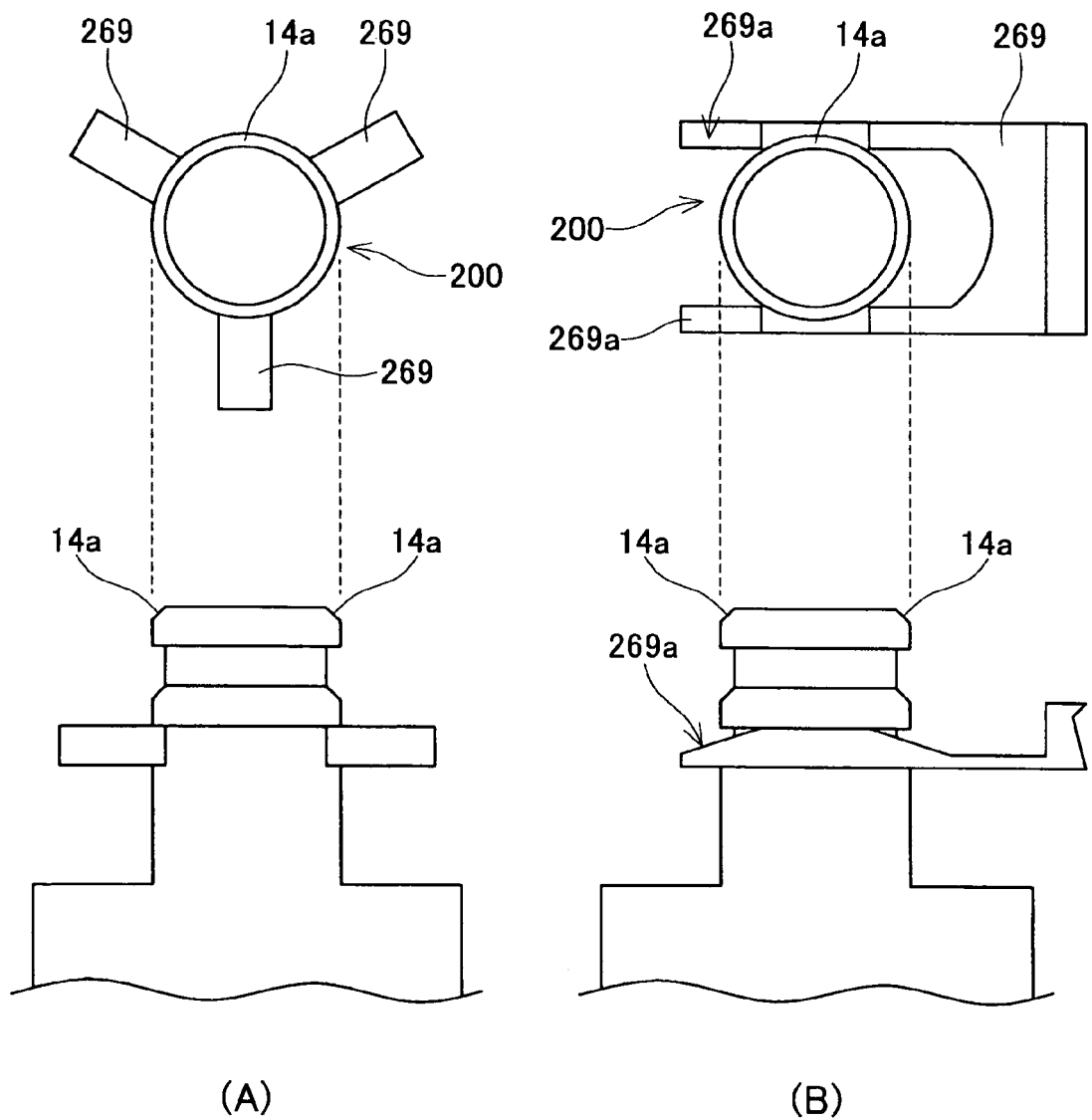
FIG. 16(A) shows an example of a second engagement member.
FIG. 16(B) shows another example of a second engagement member.

Moreover, components with various features may be adopted in the holding means 266. For example, as shown in FIG. 16(A), the holding member 200 may be held utilizing a plurality of the second engagement members 269. Alternatively, as shown in FIG. 16(B), the holding member 200 may be held utilizing a second engagement member 269 that has two arms.

In order for optical communication to be performed stably between the optical waveguide 12 of the holding member 200 and the optical waveguide 12 of the other holding member 200, it is desirable to have a satisfactory optical connection between the end face of the optical waveguide 12 of the holding member 200 and the end face of the optical waveguide 12 of the other holding member 200. In order to realize a satisfactory optical connection, it is desirable to dispose the holding member 200 and the other holding member 200 with a predetermined positional relationship.

As shown in FIG. 14, when the second portion 14 of the other holding member 200 is inserted into the insert bore 60 of the holding member 200, the other side end 265 of the first engagement member 264 protruding into the insert bore 60 slides along a tapered face 14a of the second portion 14 that is being inserted. Since the first engagement member 264 is fixed to the holding member 200 by means of the supporting rod 264a, the movement of the first engagement member 264 in the axial direction of the first penetrating hole 263 is regulated. As a result, a part of the first engagement member 264 that is further to the insert bore 60 side than the supporting rod 264a receives compressive stress and deforms elastically. The insert bore 60 of the holding member 200 thus receives the second portion 14 of the other holding member 200. Further, the first engagement member 264 rotates around the supporting rod 264a, and the side end 262 of the first engagement member 264 moves upward. Further, as shown in FIG. 15, the other side end 265 of the first engagement member 264 engages with the first projection 261 when the second portion 14 of the other holding member 200 is inserted to a deep position in the insert bore 60 of the holding member 200. When the other side end 265 of the first engagement member 264 engages with the first projection 261, the side end 262 of the first engagement member 264 returns to its initial position. The user can thus visually ascertain that the second portion 14 of the other holding member 200 has been inserted to the predetermined position in the insert bore 60 of the holding member 200. Further, when the first engagement member 264 and the first projection 261 are engaged, the holding member 200 and the other holding member 200 are joined together. Although this state is a semi stopped state, the detecting means 260 provides a resistance force to prevent the other holding member 200 from coming out of the holding member 200. As a result, the user can ascertain by means of this resistance force that the second portion 14 of the other holding member 200 has been inserted to the predetermined position in the insert bore 60 of the holding member 200.

When the holding member 200 and the other holding member 200 are disposed with the predetermined positional relationship, the second projection 267 of the holding means 266 can engage with the second engagement member 269 that has passed through the second penetrating hole 268. The second projection 267 of the holding means 266 cannot engage with the second engagement member 269 until the holding member 200 and the other holding member 200 have been disposed with the predetermined positional relationship. The second projection 267 of the holding means 266 can engage with the second engagement member 269 that has passed through the second penetrating hole 268 when the first engagement member 264 and the first projection 261 of the detecting means 260 are in an engaged state. The holding means 266 can firmly maintain the holding member 200 and the other holding member 200 in a state where they are disposed in the predetermined positional relationship. As a result, stable optical communication can be performed between the optical waveguide 12 of the holding member 200 and the optical waveguide 12 of the other holding member 200. In particular, the second engagement member 269 shown in FIG. 16(B) has a tapered face 269a, and the optical waveguide 12 of the holding member 200 and the optical waveguide 12 of the other holding member 200 can be fitted tightly together utilizing this tapered face 269a. Since the distance between the optical waveguide 12 of the holding member 200 and the optical waveguide 12 of the other holding member 200 can consequently be made shorter, the optical signals are prevented from widening spatially, and more stable optical communication can be provided.

Further, the user can ascertain from the second engagement member 269 having passed through the second penetrating hole 268 that the other side end 265 of the first engagement member 264 is engaged with the first projection 261.

Moreover, when the side end 262 of the first engagement member 264 is moved upward, the other side end 265 thereof moves downward, allowing the other side end 265 of the first engagement member 264 to disengage from the first projection 261. If the holding members 200 are attached in the wrong sequence when a plurality of the holding members 200 are to be joined, it is thereby possible to disengage the holding members 200 and rejoin them correctly.

Sixth Embodiment

Figure 17:
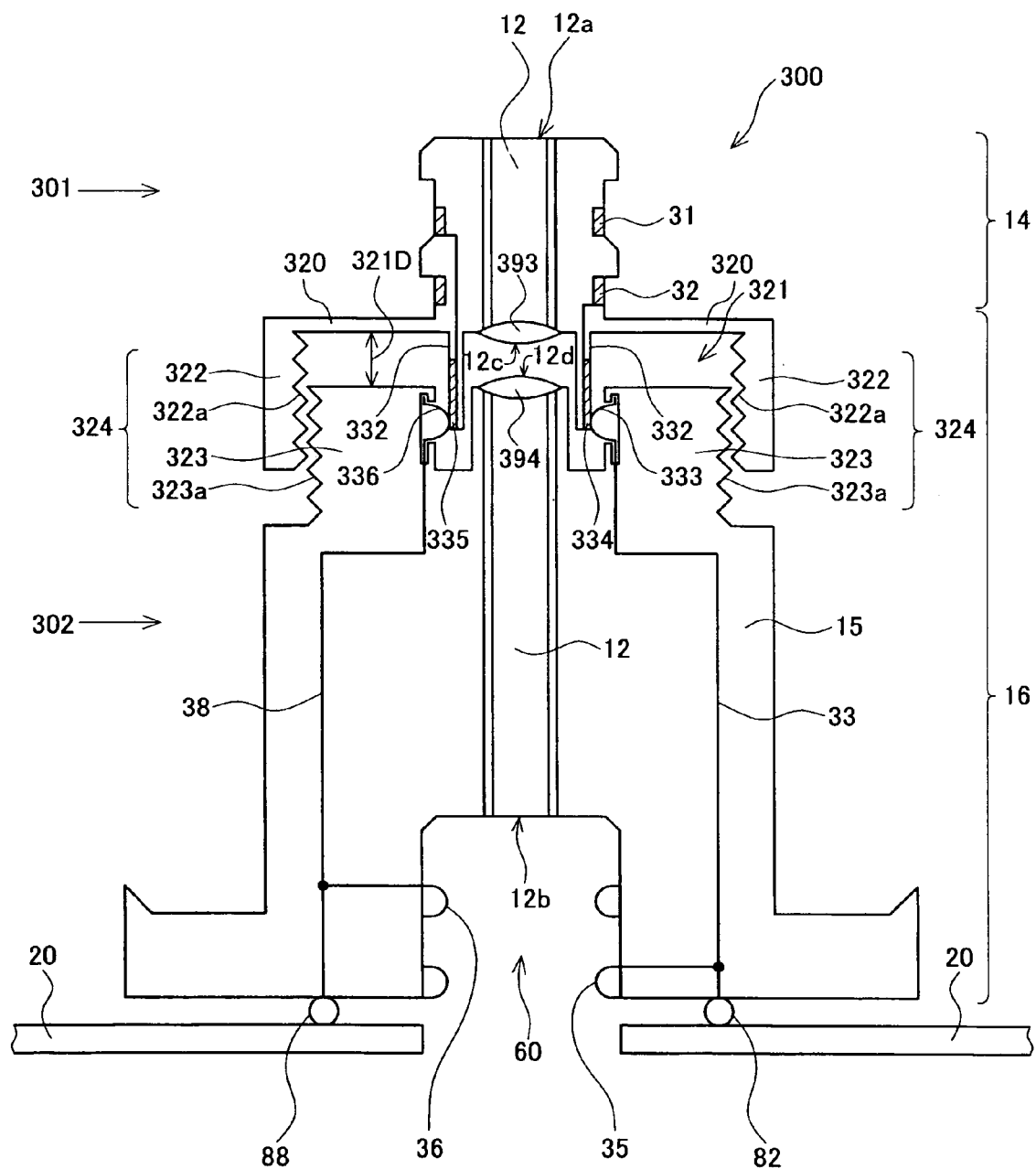
FIG. 17 schematically shows a cross-sectional view of a holding member that has a divided portion and a remaining portion.

FIG. 17 schematically shows a cross-sectional view of a holding member 300. Moreover, where the compositional elements and the operation and effects are the same as in the other embodiments, the same numbers are applied thereto, and a description thereof is omitted.

The body 15 of the holding member 300 comprises a divided portion 301 divided from a remaining portion 302 along the penetrating direction (the up-down direction of the page) of the optical waveguide 12, and an attaching means 324 that attaches the divided portion 301 to the remaining portion 302 while being capable of varying a distance 321D therebetween. The divided portion 301 is formed in a cap shape. The divided portion 301 comprises the second portion 14 of the body 15, a plate 320 that widens in a horizontal direction from a bottom face of the second portion 14, and a peripheral edge plate 322 that extends vertically downward along a peripheral edge of the plate 320. The peripheral edge plate 322 has a cylindrical shape. A female screw 322a (an example of a first screw head) is screwed into an inner surface of the peripheral edge plate 322. A screw portion 323 is formed on a part of the first portion 16 of the body 15 that corresponds to the peripheral edge plate 322, this screw portion 323 having a diameter smaller than the diameter of the body 15. The screw portion 323 can be thought of as a protrusion portion formed on a top face of the remaining portion 302. A male screw 323a (an example of a second screw head) that corresponds to the female screw 322a of the peripheral edge plate 322 is screwed into an outer surface of the screw portion 323. The attaching means 324 consists of the peripheral edge plate 322, the female screw 322a formed on the peripheral edge plate 322, the screw portion 323, and the male screw 323a formed on the screw portion 323. By adjusting the amount to which the attaching means 324 is screwed together, the attaching means 324 can adjust the distance 321D between the divided portion 301 and the remaining portion 302. Since the attaching means 324 is formed on the first portion 16 of the body 15, the length of the first portion 16 can be adjusted by means of the attaching means 324.

The divided portion 301 further comprises a cylindrical electrode 332 that extends vertically downward from a bottom face of the plate 320. The cylindrical electrode 332 forms a loop around the periphery of the optical waveguide 12. The power supply wire 38 extending from the power supply second terminal 31 is disposed on a part of the cylindrical electrode 332. The power supply wire 38 is electrically connected with a cylindrical electrode power supply connector 335 formed on a part of an outer surface of the cylindrical electrode 332. Further, the grounding wire 33 extending from the grounding second terminal 32 is disposed on an other part of the cylindrical electrode 332. The grounding wire 33 is electrically connected with a cylindrical electrode grounding connector 334 formed on a part of the outer surface of the cylindrical electrode 332. The cylindrical electrode power supply connector 335 and the cylindrical electrode grounding connector 334 are separated along the circumference direction of the cylindrical electrode 332. Alternatively, the cylindrical electrode power supply connector 335 and the cylindrical electrode grounding connector 334 may be separated along the axial direction of the cylindrical electrode 332.

A groove for receiving the cylindrical electrode 332 is formed in an upper portion of the screw portion 323. This groove forms a loop around the periphery of the optical waveguide 12 at the upper portion of the screw portion 323. A screw portion power supply connector 336 is disposed on a part of an inner surface that defines the groove. The screw portion power supply connector 336 utilizes a spring type metal terminal. The screw portion power supply connector 336 is electrically connected with the power supply wire 38 extending from the power supply first terminal 36. The screw portion power supply connector 336 and the cylindrical electrode power supply connector 335 are electrically connected. The power supply first terminal 36 and the power supply second terminal 31 are thus electrically connected via the power supply wire 38, the screw portion power supply connector 336, and the cylindrical electrode power supply connector 335. Further, a screw portion grounding connector 333 is disposed on an other part of the inner surface that defines the groove. The screw portion grounding connector 333 is electrically connected with the grounding wire 33 extending from the grounding first terminal 35. The screw portion grounding connector 333 and the cylindrical electrode grounding connector 334 are electrically connected. The grounding first terminal 35 and the grounding second terminal 32 are thus electrically connected via the grounding wire 33, the screw portion grounding connector 333, and the cylindrical electrode grounding connector 334.

The optical waveguide 12 comprises a third end face 12c exposed within a space 321 between the divided portion 301 and the remaining portion 302, and formed at the optical waveguide 12 of the divided portion 301. The optical waveguide 12 comprises a fourth end face 12d exposed within the space 321 between the divided portion 301 and the remaining portion 302, and formed at the optical waveguide 12 of the remaining portion 302. The optical waveguide 12 further comprises collecting lenses 393 and 394 disposed at the third end face 12c and the fourth end face 12d.

Figure 18:
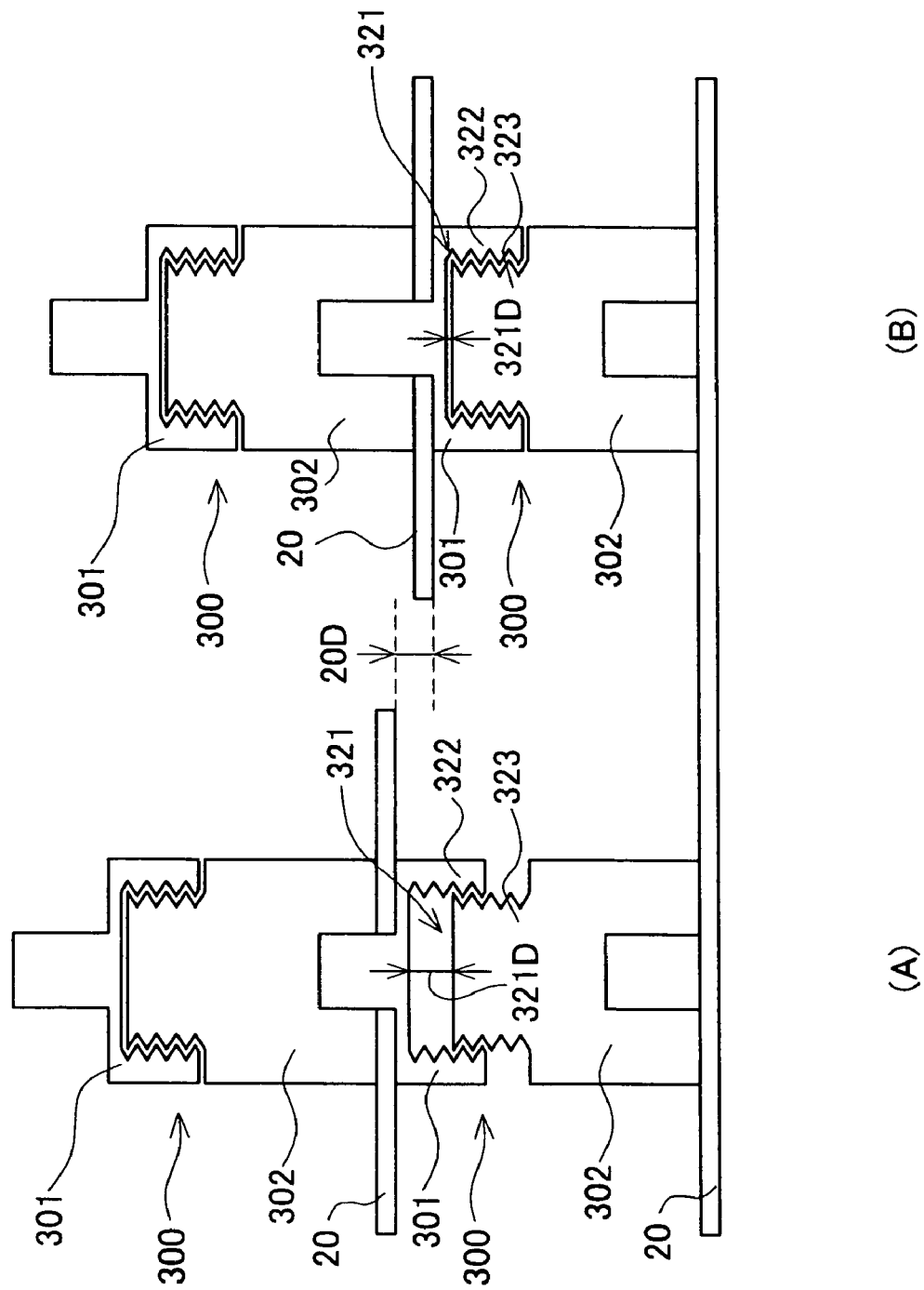
FIG. 18(A) shows a state where a holding member fits with an other holding member in the case where there is a large distance between the circuit boards.
FIG. 18(B) shows a state where a holding member fits with an other holding member in the case where there is a small distance between the circuit boards.

Next, characteristics of the holding member 300 will be described with reference to FIG. 18.

There is often a variation in the distance required between the circuit boards 20 according to the type of circuit board 20 and the purpose thereof. For example, a difference 20D is required in the distance required between the circuit boards 20 in the case in FIG. 18(A) and the distance required between the circuit boards 20 in the case in FIG. 18(B).

The holding member 300 can adjust the distance 321D between the divided portion 301 and the remaining portion 302 utilizing the attaching means 324. The attaching means 324 can adjust the length of the first portion 16. The holding member 300 can thus be made to correspond to the requirement for differing distances between the circuit boards 20 as in the cases of FIG. 18(A) and FIG. 18(B).

The holding member 300 further consists of a countermeasure within the space 321 between the divided portion 301 and the remaining portion 302 devised to prevent optical communication from becoming unstable due to the optical signal spreading spatially. As shown in FIG. 17, the collecting lenses 393 and 394 are disposed at the third end face 12c and the fourth end face 12d. The collecting lens 393 prevents the optical signal from spreading spatially within the space 321 even though this space 321 is formed between the divided portion 301 and the remaining portion 302, and the optical signal can consequently travel efficiently from the third end face 12c to the fourth end face 12d. Further, the collecting lens 394 prevents the optical signal from spreading spatially within the space 321, and the optical signal can consequently travel efficiently from the fourth end face 12d to the third end face 12c.

Further, it is preferred that the focal distance of the collecting lenses 393 and 394 can be changed.

Further, the following variant can also be considered.

Figure 19:
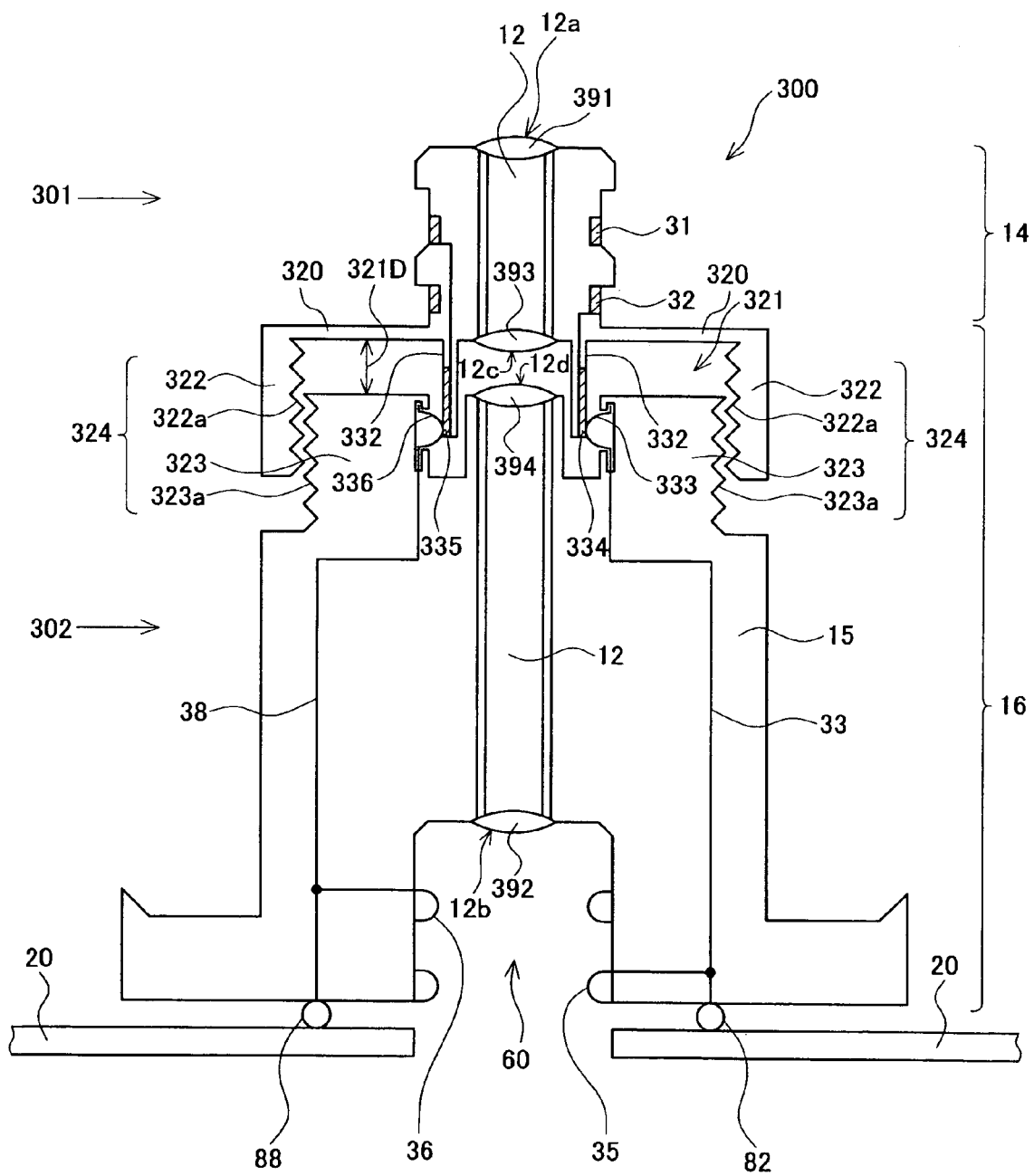
FIG. 19 shows a variant of the holding member of FIG. 17.

FIG. 19 schematically shows a cross-sectional view of a variant of the holding member 300. The optical waveguide 12 of the holding member 300 comprises collecting lenses 391 and 392 disposed at the first end face 12a and the second end face 12b.

Figure 20:
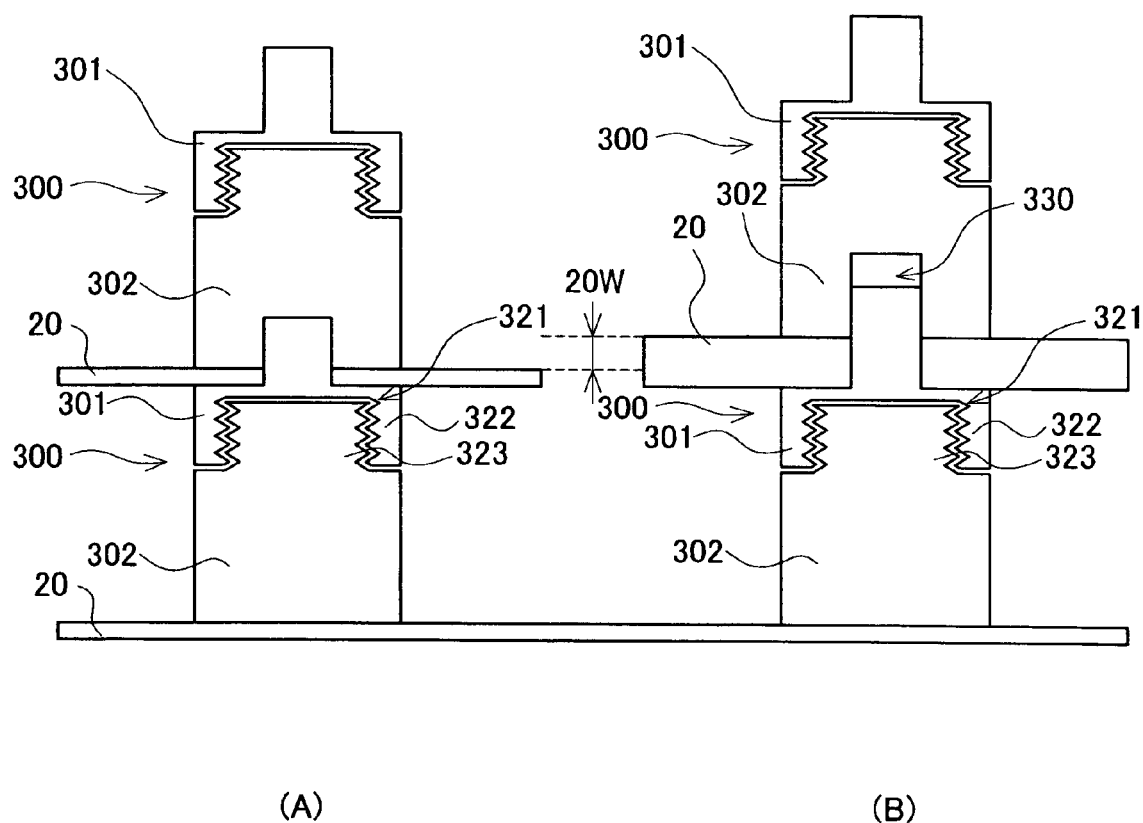
FIG. 20(A) shows a state where a holding member fits with an other holding member in the case where a circuit board is thin.
FIG. 20(B) shows a state where a holding member fits with an other holding member in the case where a circuit board is thick.

The collecting lenses 391 and 392 are useful in, for example, cases such as that shown in FIG. 20. FIG. 20 shows an example of a case where there is a difference 20W in the thickness of the circuit boards 20. As shown in FIG. 20(A), the holding member 300 fits satisfactorily with the other holding member 300 in the case where the circuit board 20 is thin, and there is satisfactory optical connection of the optical waveguides 12 thereof. When the same holding members 300 are utilized to hold the thick circuit boards 20, as shown in FIG. 20(B), a space is formed in the insert bore 60 between the holding member 300 and the other holding member 300. The optical waveguide 12 is not formed in the space in the insert bore 60. However, when the collecting lenses 391 and 392 are disposed at the first end face 12a and the second end face 12b, the collecting lenses 391 and 392 are able to prevent the optical signal from widening spatially within the space in the insert bore 60. The collecting lenses 391 and 392 are thus able to cause the optical signal to travel efficiently from one end face to the other end face. It is thus possible, by providing the collecting lenses 391 and 392, to utilize only one type of holding member 300 to correspond to a plurality of the circuit boards 20 having differing thicknesses. As a result, the number of components can be reduced when a module is to be constructed, and costs can be greatly reduced.

Further, it is preferred that the focal distance of the collecting lenses 391 and 392 can be changed.

Specific examples of the present invention are described above in detail, but these examples are merely illustrative and place no limitation on the scope of the patent claims. The technology described in the patent claims also encompasses various changes and modifications to the specific examples described above.

Furthermore, the technical elements explained in the present specification and drawings provide technical value and utility either independently or through various combinations. The present invention is not limited to the combinations described at the time the claims are filed. Further, the purpose of the example illustrated by the present specification and drawings is to satisfy multiple objectives simultaneously, and satisfying any one of those objectives gives technical value and utility to the present invention.

The invention claimed is:

1. A holding member for holding three or more circuit boards with a predetermined distance between the circuit boards and providing an optical communication path between the circuit boards, comprising:

a body; and an optical waveguide penetrating the body, wherein the body comprises a first portion and a second portion, the first portion including an insert bore which receives the second portion of the other holding member, the insert bore extends from an end face of the first portion along the penetrating direction of the optical waveguide, a configuration of the insert bore substantially conforms to a configuration of the second portion, and by inserting the second portion of the other holding member into the insert bore of the holding member through an opening formed in the circuit board, being adapted for connecting any of the holding members to any of the holding members while holding the circuit board, an end face of the optical waveguide of the holding member is optically connected to an end face of the optical waveguide of the other holding member.

2. The holding member according to claim 1, wherein:
the optical waveguide is a plastic fiber.

3. The holding member according to claim 1, further comprising:

a first reflecting means disposed within the optical waveguide, this first reflecting means reflecting at least a part of an optical signal traveling along the optical waveguide toward an outside of the optical waveguide; and a light receiving element disposed at the outside of the optical waveguide, this light receiving element converting the optical signal reflected by the first reflecting means into an electrical signal.

4. The holding member according to claim 3, wherein:
the first reflecting means comprises a half mirror, and
the first reflecting means reflects the part of the optical signal traveling along the optical waveguide and lets the remainder of the optical signal through.

5. The holding member according to claim 4, wherein
the first reflecting means comprises a pair of half mirrors, and
the first reflecting means reflects a part of the optical signal traveling from one side to the other side along the optical waveguide toward the light receiving element, and reflects a part of the optical signal traveling from the other side to the one side along the optical waveguide toward the light receiving element.

6. The holding member according to claim 3, further comprising:

a terminal exposed at a surface of the holding member; and a connecting wire connecting the terminal to the light receiving element, whereby a conducting line which electrically connects the light receiving element to the circuit board is provided.

7. The holding member according to claim 1, further comprising:

a light emitting element disposed at an outside of the optical waveguide, this light emitting element converting an electrical signal into an optical signal; and a second reflecting means disposed within the optical waveguide, this second reflecting means reflecting the optical signal from the light emitting element into the optical waveguide.

8. The holding member according to claim 7, wherein:
the second reflecting means comprises a half mirror, and the second reflecting means reflects the optical signal from the light emitting element into the optical waveguide and lets the optical signal traveling along the optical waveguide through.

9. The holding member according to claim 8, wherein:
the second reflecting means comprises a pair of half mirrors, and
the second reflecting means reflects the optical signal from the light emitting element toward one side of the optical waveguide and reflects the optical signal from the light emitting element toward the other side of the optical waveguide.

10. The holding member according to claim 7, further comprising:

a terminal exposed at a surface of the holding member; and a connecting wire connecting the terminal to the light emitting element, whereby a conducting line which electrically connects the light emitting element to the circuit board is provided.

11. The holding member according to claim 1, wherein:
the optical waveguide comprises:
a first end face formed at one side end in a penetrating direction;
a second end face formed at the other side end in the penetrating direction; and
at least one collecting lens disposed at the first and/or the second end face.

12. The holding member according to claim 1, wherein:
an outer diameter of the first portion is larger than an outer diameter of the second portion,
a step is formed between the first portion and the second portion,
by inserting the second portion of the other holding member into the insert bore of the holding member through an opening formed in the circuit board, being adapted for connecting any of the holding members to any of the holding members while holding the circuit board therebetween, an end face of the optical waveguide of the holding member is optically connected to an end face of the optical waveguide of the other holding member.

13. The holding member according to claim 1, wherein
the body comprises:
a detecting means for detecting whether the second portion of the other holding member is inserted to a predetermined position in the insert bore of the holding member when the second portion of the other holding member is inserted into the insert bore of the holding member, and
a holding means for holding the holding member and the other holding member at the predetermined position.

14. The holding member according to claim 13, wherein,
the detecting means comprises:
a first penetrating hole formed in at least a portion of the first portion and extending from an outer surface to the insert bore;
a first projection formed upon at least a portion of an outer surface of the second portion, and
a first engagement member disposed within the first penetrating hole, one side end of the first engagement member being exposed at the outer surface of the first portion, and an other side end of the first engagement member protruding into the insert bore,
wherein by inserting the second portion of the other holding member into the insert bore of the holding member, the other side end of the first engagement member of the holding member is elastically deformed by the second portion of the other holding member being inserted, the other side end of the first engagement member of the holding member engages with the first projection of the other holding member when the second portion is inserted to the predetermined position, and moving the one side end of the first engagement member causes the other side end thereof to move, disengaging the holding member and the other holding member.

15. The holding member according to claim 13, wherein, the holding means comprises:
a second penetrating hole formed in at least a portion of the first portion, extending from the outer surface to the insert bore, and receiving a second engagement member; and
a second projection formed upon at least a portion of the outer surface of the second portion,
wherein when the second portion of the other holding member is inserted to the predetermined position in the insert bore of the holding member, the second projection of the other holding member engages with the second engagement member inserted through the second penetrating hole of the holding member.

16. The holding member according to claim 1, further comprising:
a first terminal formed upon at least a portion of an inner surface which defines the insert bore;
a second terminal formed upon at least a portion of an outer surface of the second portion, and
a wire disposed at an outside of the optical waveguide and electrically connecting the first terminal to the second terminal,
wherein when the second portion of the other holding member is inserted into the insert bore of the holding member, the first terminal of the holding member is electrically connected to the second terminal of the other holding member.

17. The holding member according to claim 1, further comprising:
a grounding first terminal formed upon at least a portion of an inner surface which defines the insert bore;
a grounding second terminal formed upon at least a portion of an outer surface of the second portion;
a grounding wire disposed at an outside of the optical waveguide and electrically connecting the grounding first terminal to the grounding second terminal;
a power supply first terminal formed upon at least a portion of the inner surface which defines the insert bore;
a power supply second terminal formed upon at least a portion of the outer surface of the second portion, and
a power supply wire disposed at an outside of the optical waveguide and electrically connecting the power supply first terminal to the power supply second terminal,
wherein when the second portion of the other holding member is inserted into the insert bore of the holding member, the grounding first terminal of the holding member is electrically connected to the grounding second terminal of the other holding member, and the power supply first terminal of the holding member is electrically connected to the power supply second terminal of the other holding member.

18. The holding member according to claim 17, further comprising:
a noise filter connected to the power supply wire.

19. The holding member according to claim 1, further comprising:
a wiping mechanism disposed in the insert bore, wherein the wiping mechanism includes:
a wiper, and
an arm supporting the wiper from the inner surface which defines the insert bore, this arm enabling the wiper to move,
wherein, in the wiping mechanism, when the second portion of the other holding member is inserted into the insert bore of the holding member, the wiper moves while making contact with the end face of the optical waveguide exposed at the end face of the second portion of the other holding member.

20. The holding member according to claim 1, wherein the body comprises:
a divided portion divided from a remaining portion of the body along the penetrating direction of the optical waveguide, and
an attaching means attaching the divided portion to the remaining portion while being capable of varying distance therebetween,
the optical waveguide comprises:
a third end face exposed within a space between the divided portion and the remaining portion, and formed at the optical waveguide within the divided portion;
a fourth end face exposed within the space between the divided portion and the remaining portion, and formed at the optical waveguide within the remaining portion, and
at least one collecting lens disposed at the third and/or the fourth end face.

21. The holding member according to claim 20, wherein the attaching means comprises:
a first screw head formed on the divided portion, and
a second screw head formed on the remaining portion,
wherein the divided portion and the remaining portion are screwed together by using the first screw head and the second screw head.

22. A module comprising:
three or more circuit boards, and
a holding member holding one of the circuit boards and the other circuit board with a predetermined distance therebetween, wherein
the holding member comprises a body and an optical waveguide penetrating the body,
the body comprises a first portion and a second portion, the first portion including an insert bore which receives the second portion of the other holding member,
the insert bore extends from an end face of the first portion along the penetrating direction of the optical waveguide,
a configuration of the insert bore substantially conforms to a configuration of the second portion,
by inserting the second portion of the other holding member into the insert bore of the holding member through an opening formed in the circuit board, being adapted for connecting any of the holding members to any of the holding members while holding the circuit board, an end face of the optical waveguide of the holding member is optically connected to an end face of the optical waveguide of the other holding member, and
an optical signal, which the one of the circuit boards sends out and the other circuit board receives, travels along the optical waveguide of the holding member.

23. The module according to claim 22, further comprising:
an engagement means formed on the circuit board for holding the holding member to the circuit board by engaging with the holding member.

24. A series of holding members for holding three or more circuit boards with a predetermined distance between the circuit boards and providing an optical communication path between the circuit boards, comprising:

a first holding member including a body, an optical waveguide, a light receiving element for converting at least a part of an optical signal traveling along the optical waveguide into an electrical signal, and a light emitting element for emitting an optical signal which is to be introduced into the optical waveguide;

a second holding member including a body, an optical waveguide, and a light receiving element for converting at least a part of an optical signal traveling along the optical waveguide into an electrical signal;

a third holding member including a body, an optical waveguide, and a light emitting element for emitting an optical signal which is to be introduced into the optical waveguide, and a fourth holding member including a body and an optical waveguide, wherein the first, the second, the third and the fourth holding members have a common configuration, being adapted for connecting any of the holding members to any of the holding members while holding the circuit board therebetween, and being adapted for optically connecting an end face of the optical waveguide of any of the holding members to an end face of the optical waveguide of any of the holding members, the first holding member is selected for the circuit board which sends a signal to and receives a signal from another circuit board, the second holding member is selected for the circuit board which receives a signal from another circuit board, the third holding member is selected for the circuit board which sends a signal to another circuit board, and the fourth holding member is selected for the circuit board which does not send a signal to and does not receive a signal from another circuit board.

* * * * *